United States Patent
Gibbons et al.

(10) Patent No.: US 6,200,655 B1
(45) Date of Patent: *Mar. 13, 2001

(54) PROCESS FOR MATERIALS FOR ALIGNING LIQUID CRYSTALS AND LIQUID CRYSTAL OPTICAL ELEMENTS

(75) Inventors: Wayne M. Gibbons, Bear, DE (US); Paul J. Shannon, Exton, PA (US); Shao-Tang Sun, Newark, DE (US)

(73) Assignee: Elsicon, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 09/238,683

(22) Filed: Jan. 25, 1999

Related U.S. Application Data

(62) Division of application No. 08/886,560, filed on Jul. 1, 1997, now Pat. No. 5,965,691, which is a division of application No. 08/624,945, filed on Mar. 29, 1996, now Pat. No. 5,807,498.

(51) Int. Cl.⁷ .......................... C09K 19/52; G02F 1/1337
(52) U.S. Cl. .................. 428/1.2; 428/1.25; 428/1.26; 349/124; 349/123; 349/135; 252/299.4
(58) Field of Search ............... 252/299.01, 299.4; 349/124, 126, 135, 193; 428/1.2, 1.25, 1.26; 528/353

(56) References Cited

U.S. PATENT DOCUMENTS

| | | | |
|---|---|---|---|
| 5,166,304 | * 11/1992 | Dubal et al. | 528/125 |
| 5,807,498 | * 9/1998 | Gibbons et al. | 252/299.4 |
| 5,808,716 | * 9/1998 | Gass et al. | 349/124 |
| 5,965,691 | * 10/1999 | Gibbons et al. | 528/353 |

* cited by examiner

Primary Examiner—Shean C. Wu
(74) Attorney, Agent, or Firm—Huntley & Associates

(57) ABSTRACT

A process for aligning liquid crystals adjacent to a surface of an optical alignment layer comprising: exposing at least one optical alignment layer, comprising anisotropically absorbing molecules, to polarized light; the polarized light having a wavelength within the absorption band of said anisotropically absorbing molecules; wherein the exposed anisotropically absorbing molecules induce alignment of a liquid crystal medium at an angle + and − with respect to the direction of the polarization of the incident light beam and along the surface of the optical alignment layer; and applying a liquid crystal medium to said optical alignment layer; wherein said anisotropically absorbing molecules consist essentially of diary ketones, is described. The invention also is directed to a liquid crystal optical storage medium, a liquid crystal display element, and a liquid crystal diffractive optical element made by the process of the invention and to novel polyimide compositions that are useful as optical alignment layers in the process of the invention.

7 Claims, 8 Drawing Sheets

PROCESS FOR MATERIALS FOR ALIGNING LIQUID CRYSTALS AND LIQUID CRYSTAL OPTICAL ELEMENTS

This application is a division of application Ser. No. 08/886,560, filed Jul. 1, 1997, now U.S. Pat. No. 5,965,691 which is a division of application Ser. No. 08/624,945, filed Mar. 29, 1996, now U.S. Pat. No. 5,807,498.

This invention was made with United States Government support under cooperative agreement No. 70NANB4H1525 awarded by the United States Department of Commerce. The United States Government has certain rights in the invention.

BACKGROUND OF INVENTION

The present invention relates to processes for aligning liquid crystals, compositions useful for generating alignment of liquid crystals and liquid crystal optical elements.

Liquid crystal compounds are used in human and machine readable displays, fining applications in instrument controls, such as those in motor vehicles, avionics, medical devices, process control devices and watches. Display devices are primarily comprised of liquid crystal cells having a glass or other substrate coated with a transparent conductive material in front and behind a liquid crystal medium. Light transmission through these devices is controlled through orientation of the liquid crystal compounds or dyes dissolved therein. In this way, a voltage or, in some instances, a magnetic field may be applied to the cell so that the liquid crystals are oriented in a fashion such that all, some or none of the light is passed through. In addition, depending on the device geometry, polarizers may be used in conjunction with the liquid crystal medium to control light transmission.

Aligned liquid crystal cells in commercial use are typically oriented in directions suitable for controlling light transmission. That is, the molecules in the liquid crystal composition are aligned so as to assume a homogeneous or homeotropic alignment. Without external stimuli the display will either appear opaque or transparent. By applying an electric field the molecules are rotated along a fixed axis so as to alter the transmission properties in a desired fashion.

Current liquid crystal display elements include a product that utilizes a twisted nematic mode, i.e. having a structure wherein the aligning direction of nematic liquid crystal molecules is twisted by 90° between a pair of upper and lower electrode substrates, a product utilizing a supertwisted nematic mode, utilizing a birefringent effect, i.e. having a structure wherein the aligning direction of nematic liquid crystal molecules is twisted by 180° to 300°, a product utilizing a ferroelectric liquid crystal substance or an anti-ferroelectric liquid crystal substance. Common to each of these products is a liquid crystal layer disposed between a pair of substrate coated with a polymeric alignment layer. The polymeric alignment layer controls the direction of alignment of the liquid crystal medium in the absence of an electric field. Usually the direction of alignment of the liquid crystal medium is established in a mechanical buffing process wherein the polymer layer is buffed with a cloth or other fibrous material. The liquid crystal medium contacting the buffed surface typically aligns parallel to the mechanical buffing direction. Alternatively, an alignment layer comprising anisotropically absorbing molecules may be exposed to polarized light to align a liquid crystal medium as disclosed in U.S. Pat. Nos. 5,032,009 and 4,974,941, both entitled "Process of Aligning and Realigning Liquid Crystal Media." both of which are hereby incorporated by reference.

The process for aligning liquid crystal media with polarized light is a noncontact method of alignment which can reduce dust and static charge buildup on alignment layers. Other advantages of the optical alignment process include high resolution control of alignment direction and high quality of alignment.

Requirements of optical alignment layers for liquid crystal displays include low energy threshold for alignment, transparency to visible light (no color), good dielectric properties and voltage holding ratios, long-term thermal and optical stability and in many, but not all, applications, a controlled uniform pre-tilt angle.

The process for aligning liquid crystal media with polarized light has many attractive features. To exploit this process for use in many liquid crystal device applications, anisotropically absorbing molecules that absorb in the ultraviolet (UV) region are desirable because they can be transparent in the visible region. Schadt, et al (Jpn. J. Appl. Phys., 1992, 31, 2155), for instance, has described polyvinyl cinnamates as a useful material for optical alignment of liquid crystals; and Hasegawa, et al (J. Photopolymer Sci. & Tech., 1995, 8, 241) has described UV exposure of a commercial polyimide and shown it to align liquid crystals.

SUMMARY OF INVENTION

The instant invention provides a process for aligning a liquid crystal medium that is useful in aligning liquid crystal displays and other liquid crystal devices. New materials for optical alignment layers are also disclosed that provide excellent alignment properties upon exposure to UV light.

Specifically, the present invention provides a process for aligning liquid crystal adjacent to a surface of an optical alignment layer comprising: (a) exposing at least one optical alignment layer, comprising anisotropically absorbing molecules, to polarized light; the polarized light having a wavelength within the absorption band of said anisotropically absorbing molecules; wherein the exposed anisotropically absorbing molecules induce alignment of a liquid crystal medium at an angle + and $-\theta$ with respect to the direction of the polarization of the incident light beam and along the surface of the optical alignment layer; and (b) applying a liquid crystal medium to said optical alignment layer; wherein the anisotropically absorbing molecules consist essentially of at least one diaryl ketone.

The invention also provides a liquid crystal optical storage medium, liquid crystal display element and a diffractive optical element preferably made by the process of the invention.

The invention further provides novel polyimide compositions for generating alignment of liquid crystals, consisting essentially of a polyimide polymer that is a copolyimide of at least one diaryl ketone tetracarboxylic dianhydride and at least three diamines, consisting essentially of at least three structural elements of the formula:

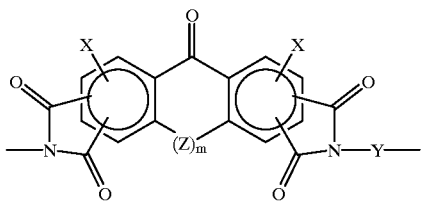
IIa wherein Y is a divalent radical selected from the formulas:

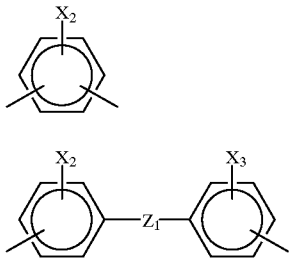
IIIa

IVa wherein Z and $Z_1$ are independently selected from the group consisting of —S—, —$SO_2$—, —O—, —$CH_2CH_2$—, —$CH_2$—, —NR—, —$C(CF_3)_2$—, —C(O)— and a covalent bond, wherein R is a $C_1$–$C_4$ hydrocarbon chain; $X_2$ is independently selected from —$R_3$, —$OR_3$, —$SR_3$, and —N($R_4$)$R_3$; wherein $R_3$ is selected from $C_1$–$C_3$ perfluorinated alkyl chain and partially fluorinated alkyl chain and $R_4$ is independently selected from $R_3$ and H; $X_3$ is independently selected from $X_2$ and H; X is independently selected from the group consisting of H, Cl, F, and Br, and m is 1 or 0.

The invention further encompasses several other novel polyimide compositions for generating alignment of liquid crystals.

DETAILED DESCRIPTION

Figure 1:
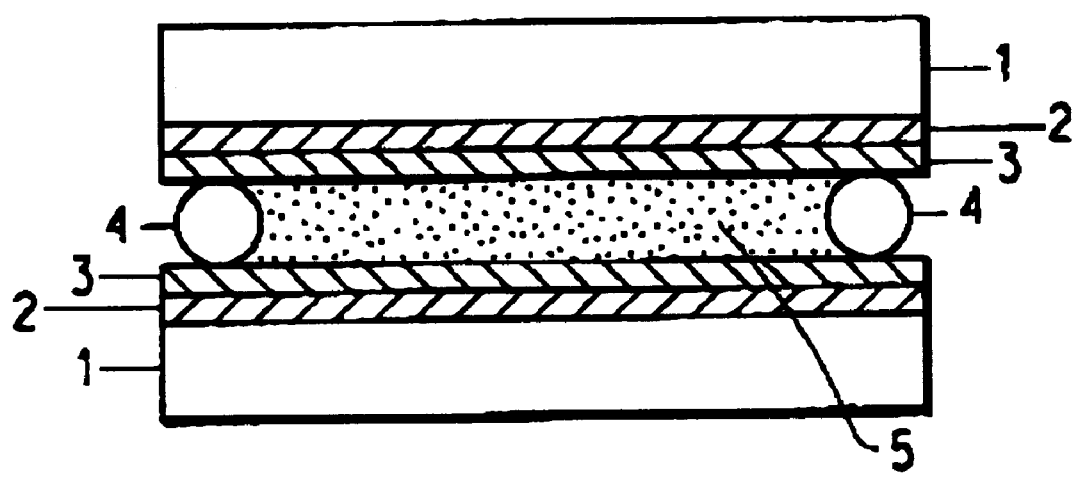
FIG. 1 is a cross-sectional view of a general liquid crystal display element of the present invention.

As used herein, "substrate" means the supporting structure for an alignment layer. A substrate can be any solid combination of layered materials that provide a useful function for the final optical alignment layer or liquid crystal display. For example, the substrate can be any combination of the following materials; crystalline or amorphous silicon, glass, plastic, including polyester, polyethylene and polyimide; quartz, indium-tin-oxide, gold, silver, silicon dioxide, polyimide, silicon monoxide, anti-reflective coatings, color filter layers, polarizers and phase compensating films. In practice, some of these materials are deposited or coated onto a basis supporting structure such as glass or plastic.

As used herein, the term "alignment layer" is the layer of material on the surface of a substrate that controls the alignment of a liquid crystal layer in the absence of an external field. A "conventional alignment layer" herein refers to an alignment layer that will only align a liquid crystal layer via processing other than optical means. For example, mechanically buffed polyimides, evaporated silicon dioxide, Langmuir-Blodgett films, have all been shown to align liquid crystals.

As used herein, the term "alignment of liquid crystals" means that the long molecular axes of the liquid crystal molecules have a preferred local alignment direction, or director. The director is the average direction of an ensemble of liquid crystal molecules which can be quantified by order parameter or other measurements well known in the art. Orientational order parameters are routinely described by the equation:

$$S = \tfrac{1}{2} \langle 3\cos^2\alpha - 1 \rangle$$

where $\alpha$ is the angle between the director and the long axis of each molecule, the molecules being regarded as cylindrically symmetric. The brackets denote an average over the ensemble of molecules. Order parameters range from 0 to 1.0. A 0 value indicates no long range alignment of the liquid crystals is present. A value of 1.0 indicates the liquid crystal molecules are fully aligned along a director. Preferred order parameters resulting from the process of the instant invention are in the range of about from 0.1 to 1.0.

"Optical alignment layer" herein refers to an alignment layer that contains anisotropically absorbing molecules that will induce alignment of liquid crystals after exposure with polarized light. Optical alignment layers may be processed by conventional means, such as mechanical rubbing, prior to or after exposure to polarized light. The anisotropically absorbing molecules of the optical alignment layers exhibit absorption properties with different values when measured along axes indifference directions. The anisotropic absorbing molecules exhibit absorption bands between 150 nm and about 2000 nm. The anistropically absorbing molecules of the optical alignment layer can be covalently bonded within a main chain polymer, they can be covalently bonded as side groups to a main polymer chain, they can be present as nonbonded solutes in a polymer, or they can be in the adjacent liquid crystal layer as a solute and adsorbed on the surface of a normal alignment layer to give an optical alignment layer.

Preferred optical alignment layers have absorbance maxima of about from 150 to 1600 nm. More preferable optical alignment layers have absorbance maxima of about from 150 nm to 800 nm. Most preferable optical alignment layers for the present invention have absorbance maxima of about from 150 and 400 nm and especially about from 300 to 400 nm.

Anisotropically absorbing molecules typically used in optical alignment layers have carbon-carbon, carbon-nitrogen, or nitrogen-nitrogen double bonds and are capable of undergoing cis-trans isomerization upon exposure to light within their absorption band. One surprising aspect of the invention described herein is that diary ketones have been found to act as efficient anisotropically absorbing molecules in the optical process of aligning liquid crystals. An advantage of using diaryl ketones is that they exhibit strong absorption in the UV region from 250 to 400 nm and generally are transparent above 400 nm.

Optical alignment layers useful in the process of the invention can have a diaryl ketone present as nonbonded solute dissolved in a polymer. These are referred to as guest-host optical alignment layers. They are prepared by coating on substrates a thin layer of organic material containing the diaryl ketones molecules. Typically the diaryl ketone is dissolved in solution along with a polymeric material. The solution is then coated on substrates using, typically, a spin casting technique. The coatings are then oven baked to remove residual solvent and perform the final cure. Specific diaryl ketones preferred in guest-host optical alignment layers are benzophenone and substituted benzophenone derivatives such as 4,4'-bis(trifluoromethyl) benzophenone, 3,4'-bis(trifluoromethyl)benzophenone, and 3,3'-bis(trifluoromethyl)benzophenone and 4,4'-diaminobenzophenone.

Alternatively, optical alignment layers are prepared by coating conventional alignment layers such as a polyimide on the substrates. The diaryl ketone is dissolved in a liquid crystal medium to give a guest-host mixture. When the guest-host mixture containing the diaryl ketone is allowed to contact a conventional alignment layer, an optical alignment layer is formed.

In still another alternate preparation technique, optical alignment layers can be prepared by coating conventional alignment layers such as polyimide on the substrates and the diaryl ketone is dissolved in a solvent. The solution containing anisotropically absorbing molecules is coated on the conventional alignment layer and the solvent evaporated to given an optical alignment layer.

A most preferred process of the invention is wherein the diaryl ketones comprise a polymer having a recurring structural element of formula:

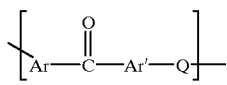

I wherein said structural element has a covalent linkage from Q to a member selected from the group Q, Ar, and Ar'; Q is an organic radical with 1 to 100 atoms; Ar and Ar' are independently selected from the group of substituted and unsubstituted phenyl, fused polycyclic aromatic and heteroaromatic rings. Preferred Ar and Ar' moieties include:

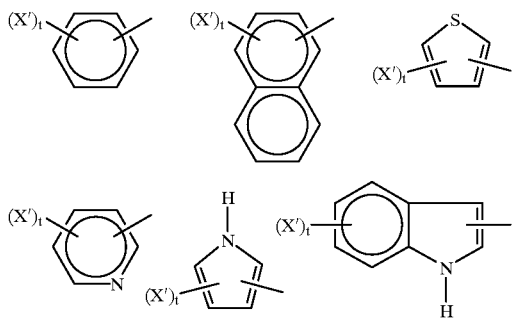

-continued

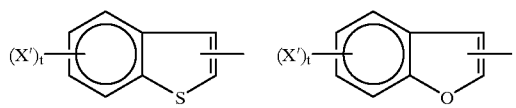

wherein X' is independently selected from the group of monovalent organic radical of 1 to 100 atoms, a divalent organic group of 1 to 20 atoms connecting Ar and Ar' to form a ring and a covalent bond connecting Ar and Ar' to form a ring; t is 0 to 4; and the polymer has a molecular weight between 600 and 5 million Daltons. Polymers comprising diaryl ketone groups are preferred because they have greater thermal and compositional stability than their guest-host counterparts. Chromophores covalently bonded to polymers tend not to sublime on thermal processing or undergo dissolution in processing with solvents.

Polymers of formula I can be of a wide variety. Polymers of formula I wherein both covalent linkages are bonded to Q have the diaryl ketone group, AR—C(O)—Ar'—, as a side group and —Q— as a main polymer chain. Typical polymers within this general class of polymers that are useful in the process of the invention are poly(methyl methacrylate), poly(methyl acrylate), poly(vinyl alcohol), and poly (styrene) copolymers that contain the diaryl ketone moiety within one of the comonomers. For instance, a poly(methyl methacrylate) copolymer incorporating the diaryl ketone moiety can be readily prepared by copolymerization of methyl methacrylate with monomer A

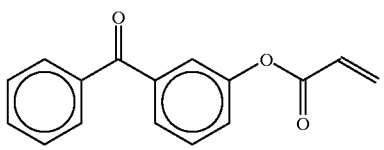

A

The synthesis of monomer A and the copolymerization of the monomer are well known in the art, for instance in, the review by R. S. Davidson et al., J. Photochem. & Photobiol., 1995, A 89, 75–87. Other copolymers containing the diaryl ketone moiety can be similarly prepared using monomers and procedures that are all well known in the art. Preferred loadings of the diaryl ketones comonomers in the copolymers are about from 5 to 100 mole % and more preferably the loading is about from 5 to 50 mole %.

Polymers of formula I wherein one covalent linkage is to Q and one covalent linkage is to Ar have the aryl ketone moiety built into the main polymer chain. Useful main chain polymers containing diarylketone moieties are poly (amides), poly(imides), poly(esters), poly(carbonates) and poly(siloxanes). For instance a poly(amide) of formula I that is useful in the process of the invention is readily prepared by the condensation of 4,4'-diaminobenzophenone with a dicarboxylic acid chloride such as adipoyl chloride to give a polymer of structure B

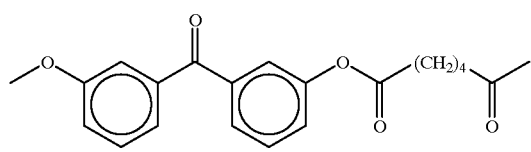

Likewise, condensation of 4,4'-dihydroxybenzophenone with the same acid chloride will give a polyester of structure C

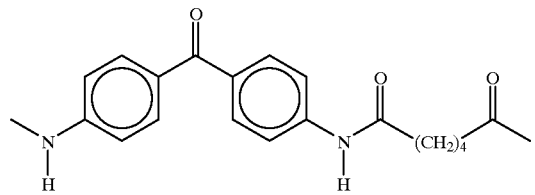

Each of these polymer families, which are readily prepared by common and well known synthetic methods, are useful in the optical process of this invention.

Polymers especially useful and preferred in the optical process of this invention are polyimides. Polyimides are known for their excellent thermal and electrical stability properties and these properties are useful in optical alignment layers for liquid crystal displays. The preparation of polyimides is described in "Polyimides", D. Wilson, H. D. Stenzenberger, and P. M. Hergenrother Eds., Chapman and Hall, New York (1990). Typically polyimides are prepared by the condensation of one equivalent of a diamine with one equivalent of a dianhydride in a polar solvent to given a poly(amic acid) prepolymer intermediate. Typical solvents used in the condensation reaction are N-methyl-pyrrolidone (NMP), dimethylacetamide (DMAc), dimethylformamide (DMF), dimethylsulfoxide (DMSO), butyl cellosolve, ethylcarbitol, γ-butyrolactone, etc. They poly(amic acid) is typically formulated to give a 1 to 30 wt % solution. The condensation reaction is usually performed between room temperature and 150° C. The prepolymer solution is coated onto a desired substrate and thermally cured at between 180 and 300° C. to complete the imidization process. Alternatively, the poly(amic acid) prepolymer is chemically imidized by addition of a dehydrating agent to form a polyimide polymer. Examples of chemical imidization reagents are organic anhydrides such as acetic anhydride and trifluoroacetic anhydride in combination with organic bases such as triethyl amine and pyridine. Other chemical imidization reagents are ethylchloroformate and triethylamine, thionyl chloride, oxalyl chloride, acetyl chloride and dicyclohexylcarbodiimide. Chemical imidizations are performed between room temperature and 150° C. Chemical imidization requires that the resulting polyimide be soluble in a solvent for further processing. Achieving solubility often requires polyimides to be specially formulated for chemical imidization. The chemically imidized polyimide solution is coated onto a substrate and heated to remove solvent, but no high temperature cure is required. Preferred optical alignment layers of this invention are derived from chemical imidized polyimide solutions.

In preparing polyimides for optical alignment layers the molar ratio of diamine to dianhydride usually is 1:1, but can vary between 0.8:1 to 1:1.2. The preferred ratio of diamine to dianhydride is between 0.98:1 and 1:1.02. Most preferred is a 1:1 ratio of diamine dianhydride.

Preferred in the process of this invention is a polyimide polymer that is a homopolyimide or a copolyimide of at least one diarylketone tetracarboxylic dianhydride and at least one diamine, which comprises at least one structural element of formula II:

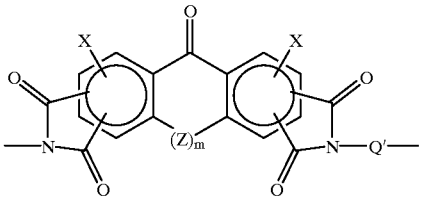

wherein Q' is a divalent organic radical derived from said diamine containing at least two carbon atoms; X is independently selected from the group consisting of H, Cl, F, Br, $R_1$ $_{1\ and\ R1}$O—; wherein $R_1$ is independently selected from $C_1$–$C_3$ perflourinated alkyl chain, $C_1$–$C_3$ partially flourinated alkyl chain and $C_1$–$C_8$ hydrocarbon chain; Z is selected from the group consisting of —S—, —$SO_2$—, —O—, —$CH_2CH_2$—, —$CH_2$—, —NR—, —$C(CF_3)_2$—, —C(O)—, or a covalent bond, wherein R is a $C_1$–$C_4$ hydrocarbon chain; and m is 1 or 0.

Polyimides of formula II can be derived from diaryl ketone dianhydrides. The most common diaryl ketone dianhydrides and the most preferred family for this invention are the benzophenonetetracarboxylic dianhydrides wherein m is 0. Benzophenonetetracarboxylic dianhydrides preferred are those having the following structure:

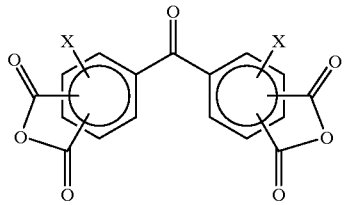

wherein X is independently selected from the group consisting of H, Cl, F, and Br.

Preferred are 3,3',4,4'-benzophenonetetracarboxylic dianhydride (D1) and 2,2'-dichloro-4,4',5,5'-benzophenone tetracarboxylic dianhydride. Both materials are colorless, provide reasonable solubility characteristics to the polyimides, and provide the necessary photoactive UV chromophore in high concentration.

Specific benzophenonetetracarboxylic dianhydrides preferred in this invention are readily available from commercial sources or synthesis. For instance, 3,3',4,4'-benzophenonetetracarboxylic dianhydride (D1) is available from Aldrich Chemical Co., Inc. (1001 W. St. Paul Ave., Milwaukee, Wis. 53233), 2,2'-Dichloro-4,4',5,5'-benzophenone tetracarboxylic dianhydride is available from 4-chloro-o-xylene by Friedel-Crafts acylation with oxalyl chloride to give 2,2'-dichloro-4,4',5,5'-tetramethylbenzophenone, followed by oxidation with nitric acid and dehydration of the resulting tetracarboxylic acid as described by Falcigno, et al., J. Poly. Sci. 1992, 30, 1433.

Other diaryl keytones dianhydrides that are useful in the process of the invention, wherein m is 1, are the polycyclic diaryl ketone dianhydrides described by Pfeifer, et al., in U.S. Pat. No. 4,698,295 and hereby incorporated by reference.

Diamines from which the divalent organic radical —Q'— is derived are not particularly limited. Specific examples include the trifluoromethyl substituted diamines 1–7 and the lower hydrocarbon homologs 8–10 of Table 1. Other aromatic diamines can be used such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl) methane, diaminodiphenylsulfone, diaminonaphthalene, 1,4-bis(4-aminophenoxy)benzene, 1,4-bis(4-aminophenyl) benzene, 9,10-bis(4-aminophenyl)anthracene, 1,3-bis(4-aminophenoxy)benzene, 4,4'-bis(4-aminophenoxy) diphenylsulfone, 2,2-bis [4-(4-aminophenoxy)phenyl] propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane; and aliphatic diamines such as tetramethylenediamine and hexamethylene diamine. Further, diaminosilixanes such as bis)3-aminopropyl)tetramethyldisiloxane may be used. Such diamines may be used alone or in combination as a mixture of two or more of them. Polyimides of formula II preferably are derived from diamines wherein Q' is a divalent radical selected from formulas III and IV

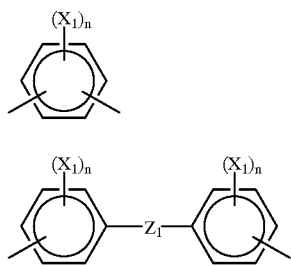

wherein $Z_1$ is selected, independently, from the same group as Z; each $X_1$ is independently selected from H, Cl, F, Br, $R_1$, —O—$R_1$, —S—$R_1$ and —N($R_2$)—$R_1$; wherein $R_1$ is independently selected from $C_1$–$C_3$ perfluorinated alkyl chain, $C_1$–$C_3$ partially fluorinated alkyl chain, and $C_1$–$C_8$ hydrocarbon chain; $R_2$ is independently selected from H and $R_1$; and n is 1 to 4. Preferably $Z_1$ is selected from —C(O)— and a covalent bond and $X_1$ is independently selected from H, —$CF_3$, —$CH_3$ and —$CH_2CH_3$.

Diamines especially preferred in the invention are diaminobenzophenones. Diaminobenzophenones are diaryl ketones and thus act as another source of photoactive species in the process. In copolyimides incorporating both diamino and dianhydride derivatives of diaryl ketones, a larger concentration of active chromophore can be achieved. Preferred diaminobenzophenones for copolyimide compositions of the instant invention is 4,4'-diaminobenzophenone and 3,4'-diaminobenzophenone.

A wide variety of other dianhydrides, of course, may be used in combination with the diaryl ketone dianhydrides in forming copolyimides useful in the process of the invention. Specific examples of the tetracarboxylic dianhydride component include aromatic dianhydrides such as pyromellitic dianhydride, 2,3,6,7-napthalenetetracarboxylic dianhydride, 1,2,5,6-naphthalenetetracarboxylic dianhydride, 1,4,5,8-naphthalenetetracarboxylic dianhydride, 3,3'4,4'-biphenyltetracarboxylic dianhydride, 2,3,2',3'-biphenyltetracarboxylic dianhydride, bis(3,4-dicarboxyphenyl)ether dianhydride, bis(3,4-dicarboxyphenyl)diphenylsulfone dianhydride, bis(3,4-dicarboxyphenyl)methane dianhydride, 2,2-bis(3,4-dicarboxyphenyl)propane dianhydride, 1,1,1,3,3,3-hexafluoro-2,2-bis(3,4-dicarboxyphenyl)propane dianhydride (D2), bis(3,4-dicarboxyphenyl)dimethylsilane dianhydride, 2,3,4,5-pyridinetetracarboxylic dianhydride; alicyclic tetracarboxylic dianhydrides such as 1,2,3,4-butanetetracarboxylic dianhydride, 1,2,3,4-cyclobutanetetracarboxylic dianhydride, 1,2,3,4-cyclopentanetetracarboxylic dianhydride, 1,2,4,5-cyclohexanetetracarboxylic dianhydride, 2,3,5=tricarboxycyclopentylacetic acid dianhydride and 3,4-dicarboxy-1,2,3,4-tetrahydro-1-naphthalenesuccinic dianhydride; and their acid and acid chloride derivatives.

"Alicyclic tetracarboxylic dianhydrides" refer to dianhydrides that are comprised either partially or in whole of saturated carbocyclic rings. The alicyclic tetracarboxylic dianhydrides impart useful solubility properties to polyimides comprising them. Alicyclic tetracarboxylic dianhydrides suitable for the invention are those listed in Table 2.

5-(2,5-Dioxotetrahydro)-3-methyl-3-cyclohexene-1,2-dicarboxylic anhydride (D3) is commercially available from Chriskev Co, Inc. 2,3,5-Tricarboxycyclopentaneacetic acid dianhydride (D4) is available via synthesis by oxidation of dicyclopentadiene with nitric acid as described by Hession, et al., in British Patent 1 518 322 (1976). The synthesis of 1,2,3,4-cyclobutanetetracarboxylic dianhydride (D5) is described by Moore, et al, Chem. Mat., 1989, /, 163, 1,2,3,4-butanetetracarboxylic dianhydride (D7) is available by dehydration of the tetracarboxylic acid (Aldrich Chemical) with acetic anhydride. 5,5'-(1,1,3,3-Tetramethyl-1,3-disiloxanediyl)-bis-(norbornane-2,3-dicarboxylic anhydride) (D8) is available by hydrosilation of 5-norbornene-2,3-dicarboxylic anhydride with 1,1,3,3-tetramethyldisiloxane as described by Ryang in U.S. Pat. No. 4,381,396. Bicyclo[2.2.1]heptanetetracarboxylic 2,3:5, 6-dianhydride (D9) is available by synthesis from bicyclo [2.2.1]hept-5-ene-2,3-dicarboxylic anhydride as described by Matsumoto et al., in Macromolecules 1995, 28, 5684. Bicyclo[2.2.2]oct-7-enetetracarboxylic 2,3:5,6-dianhydride (D10) is available by synthesis from 4-cyclohexene-1,2-dicarboxylic anhydride as described by Itamura. et al., in Macromolecules 1993, 26, 3490.

The addition of alicyclic dianhydride structural units to polyimide formulations tends to generate soluble polyimides and thus, impart very useful processing properties to the polyimides. For instance, chemical imidization may be performed without the resulting polyimide becoming insoluble. Thus, in a preferred process of the invention the polyimide is a copolyimide that includes structural elements of formula II and formula V

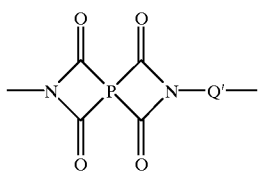

wherein P is a tetravalent organic radical derived from said alicyclic tetracarboxylic dianhydride and Q' is as described above. Preferred alicyclic dianhydrides in this process are 5-(2,5-dioxotetrahydro)-3-methyl-3-cyclohexene-1,2-dicarboxylic anhydride (D3), 2,3,5-tricarboxycyclopentaneacetic acid dianhydride (D4), 1,2,3, 4-butanetetracarboxylic dianhydride (D7) and 1,2,3,4-cyclobutanetetracarboxylic dianhydride (D5).

A dianhydride that is especially useful and preferred in combination with alicyclic dianhydrides is 1,1,1,3,3,3-hexafluoro-2,2-bis(3,4-dicarboxyphenyl)propane dianhydride (D2). This dianhydride, when present in the polyimide, tends to improve the quality of alignment of liquid crystals in comparison to those polyimides formulated from only alicyclic dianhydrides.

Preferred processes are those wherein the tetracarboxylic dianhydride from which structural formula II is derived 3,3',4,4'-benzophenonetetracarboxylic dianhydride, the alicyclic tetracarboxylic dianhydride from which structural formula V is derived is 5-(2,5-dioxotetrahydro)-3-methyl-3-cyclohexene-1,2-dicarboxylic anhydride and Q' is derived from at least one diamine selected from the group consisting of 2-(trifluoromethyl)-1,4-benzenediamine, 5-(trifluoromethyl)-1,3-benzenediamine, 2,2'-bis(trifluoromethyl)benzidene, 3,3'-bis(trifluoromethyl)benzidene and 4,4'-diaminobenzophenone.

A further embodiment of the invention is a process wherein the polyimide polymer is a homopolyimide or a copolyimide of at least one tetracarboxylic dianhydride and at least one diaminobenzophenone, which comprises at least one structural element of formula VI

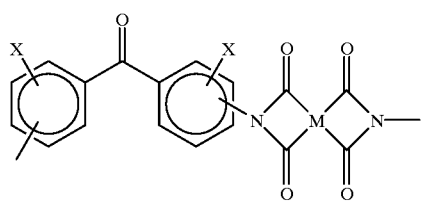

VI wherein M is a tetravalent organic radical derived from said tetracarboxylic dianhydride containing at least two carbon atoms, no more than two carbonyl groups of the dianhydride being attached to any one carbon atom of the tetravalent radical; and X is as described above. A preferred diaminobenzophenone is 4,4'-diaminobenzophenone and a preferred tetracarboxylic dianhydride is an alicyclic tetracarboxylic dianhydride as discussed above.

Other embodiments of the instant invention are novel compositions for generating alignment of liquid crystals. One such embodiment encompasses a novel composition consisting essentially of a polyimide polymer that is a copolyimide of at least one diaryl ketone tetracarboxylic dianhydride and at least three diamines, consisting essentially of at least three structural elements of the formula IIa

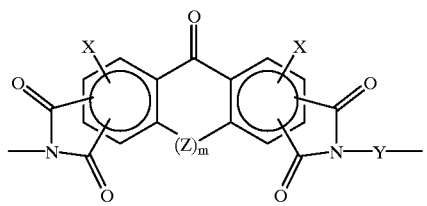

IIa wherein Y is a divalent radical selected from the formulas IIIa and IVa

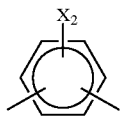

IIIa

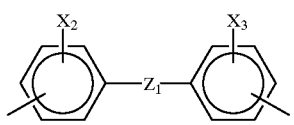

IVa wherein Z and $Z_1$ are selected, independently, from the group consisting of —S—, —$SO_2$—, —O—, —$CH_2CH_2$—, —$CH_2$—, —NR—, —$C(CF_3)_2$—, —C(O)— and a covalent bond, wherein R is a $C_1$–$C_4$ hydrocarbon chain; $X_2$ is independently selected from —$R_3$, —$OR_3$, —$SR_3$, —$N(R_4)$ $R_3$, wherein $R_3$ is selected from $C_1$–$C_3$ perfluorinated alkyl chain and partially fluorinated alkyl chain and $R_4$ is independently selected from $R_3$ and H; $X_3$ is independently from $X_2$ and H; X is independently selected from the group consisting of H, Cl, F, and Br; and m is 1 or 0.

Another preferred composition for generating alignment of liquid crystals consists essentially of a polyimide polymer that is a copolyimide of at least one diaryl ketone tetracarboxylic dianhydride and at least two diamines, consistings essentially of at least one structural element of the formula IIa and at least one structural element of formula VII

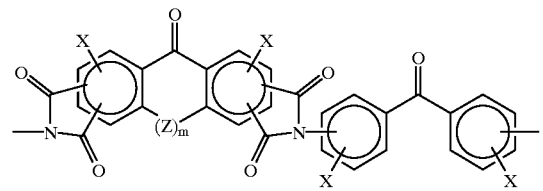

VII wherein Z, $Z_1$, X, $X_2$, $X_3$, and m are as previously described and the copolyimide consists of 99 to 1 mol % of at least one structural element of formula IIa and 1 to 99 mol % of at least one structural element of formula VII.

Another preferred novel composition is a copolyimide of at least one diaryl ketone tetracarboxylic dianhydride, at least one alicyclic tetracarboxylic dianhydride and at least one diamine, consisting essentially of at least two structural elements of the formula IIa and Va, wherein the copolyimide comprises about from 95 to 20 mol % of at least one structural element of formula IIa and about from 5 to 80 mol % of at least one structural element of formula Va.

Another preferred novel composition consists essentially of a polyimide polymer that is a homopolyimide or copolyimide of at least one diaminobenzophenone and at least one alicyclic tetracarboxylic dianhydride, consisting essentially of at least one structural element of the formula VIII

VIII

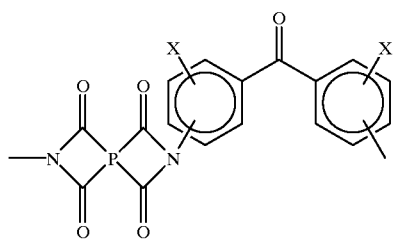

wherein P and X are as described above.

Another preferred novel composition is a copolyimide of at least one diaminobenzophenone, at least one aclicyclic tetracarboxylic dianhydride and at least one diaryl ketone tetracarboxylic anhydride, consisting essentially of at least one structural element of formula VIII and one structural element VII

VII

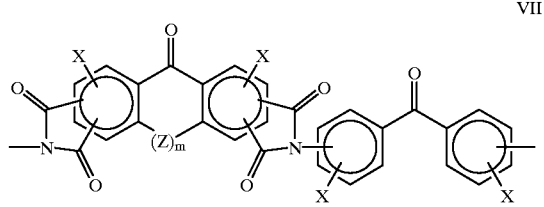

Va

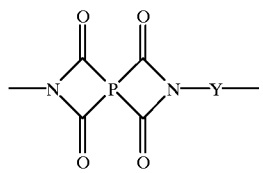

wherein X, Z and m are as described above. In a more preferred composition the copolyimide comprises about from 5 to 99.9 mol % of at least one structural element of formula VIII and about from 95 to 0.1 mol % of at least one structural element of formula VII.

Another preferred novel composition is a copolyimide of at least one diaminobenzophenone, at least one alicyclic tetracarboxylic dianhydride and 1,1,1,3,3,3-hexafluoro-2,2-bis(3,4-dicarboxyphenyl)propane dianhydride, consisting essentially of at least one structural element of formula VIII and at least one structural element of formula IX

IX

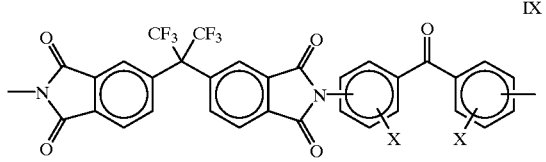

wherein X is as described above. In a more preferred composition the copolyimide consists essentially of about from 0.1 to 99 mol % of at least one structural element of formula IX and about from 99.9 to 1 mol % of at least one structural element of formula VIII.

The novel optical alignment layers derived from polyimides of formula IIa, upon exposure to polarized UV light, exhibit exceptionally high quality alignment of liquid crystals.

Preferred diamines for the novel compositions of the instant invention are those in which $X_1$ is —$CF_3$ or —$OCF_3$. Specific diamines that are more preferred are 2-(trifluoromethyl)-1,4-benzenediamine (1), 5-(trifluoromethyl)-1,3-benzenediamine (2), 2,2'-bis(trifluoromethyl)benzidene (5), 2,2'-bis(trifluoromethoxy)benzidene (6) and 3,3'-bis(trifluoromethyl)benzidene (7). Most preferred diamines are 2-(trifluoromethyl)-1,4-benzenediamine and 2,2'-bis(trifluoromethyl)benzidene Furthermore, when at least three different fluorinated diamines derived from formula IIIa and IVa are present the polyimide tends to maintain solubility after chemical imidization, and thus thermal processing of the optical alignment layer can be minimized.

Specific diamines useful in this invention are readily available from commercial sources. For instance, 2-(trifluoromethyl)-1,4-benzenediamine (1) and 5-(trifluoromethyl)-1,3-benzenediamine (2) are available from PCR Inc. (P.O. Box 1466, Gainesville, Fla., 32602); and 2,2'-bis(trifluoromethyl)benzidene (5) is available for Chriskev Co., Inc. (5109 W. 111th Tr., Leawood Kans.). 2,2'-Bis(trifluoromethoxy)benzidene (6) is prepared by reduction of 3-(trifluoromethoxy)nitrobenzene to the corresponding hydrazo derivative, followed by benzidine rearrangement as described by Feiring, et al., Macromolecules 1993, 26 2779. 3,3'-Bis(trifluoromethyl)benzidene (7) is available via the Ulman coupling of 3-bromo-6-nitrobenzotrifluoride as described for the 2,2'-isomer in Gaudiana, et al., J. Polym. Sci., Part A 1987,25 1249–1271) followed by chemical reduction of the dinitro compound to the diamine with tin (II) chloride in ethanol.

The novel compositions of the instant invention are useful in alignment of liquid crystals. Upon exposure to polarized UV light these materials exhibit fair to excellent quality alignment of a variety of liquid crystals. Furthermore, many of the compositions show excellent quality alignment of liquid crystals upon mechanical buffing or rubbing of the alignment layer with a fiberous cloth.

Compositions consisting of three or more diamines derived from radical IIIa and IVa, and compositions of alicyclic dianhydrides exhibit good solubility in typical solvents used in polyimide condensation. In these cases, the poly(amic acid) intermediates can be chemically imidized to give soluble polyimide solutions. These pre-imidized solutions are preferred for preparing optical alignment layers because they require only low temperature cure Preferred alicyclic tetracarboxylic dianhydrides for compositions of the instant invention are 5-(2,5-dioxotetrahydro)-3-methyl-3-cyclohexene -1,2-dicarboxylic anhydride, 2,3,5-tricarboxycyclopentaneacetic acid dianhydride, 1,2,3,4-butanetetracarboxylic dianhydride, and 1,2,3,4-cyclobutanetetracarboxylic dianhydride. Especially preferred alicyclic tetracarboxylic dianhydrides are for compositions of the instant invention are 5-(2,5-dioxotetrahydro)-3-methyl-3-cyclohexene-1,2-dicarboxylic anhydride and 1,2,3,4-butanetetracarboxylic dianhydride.

To prepare the optical alignment layers of this invention poly(amic acid) solutions or preimidized polyimide solutions polymer solutions are coated onto desired substrates. Coatings is usually accomplished with 2 to 30 wt % solids. Any conventional method may be used to coat the substrates including brushing, spraying, spin-casting, dipping or printing. The coated substrates are heated in an oven under an inert atmosphere, for instance nitrogen or argon, at elevated temperature usually not exceeding 300° C. and preferably at or below 180° C. for about from 1 to 12 hours, preferably for about 2 or less. The heating process removes the solvent carrier and may be used to further cure the polymer. For instance, the poly(amic) acid films are thermally cured to generate polyimide films.

The optical alignment layers are exposed to polarized light to induce alignment of liquid crystals. By "polarized light" is meant light that is elliptically polarized such that the light is more polarized along one axis (referred to as the major axis) versus the orthogonal axis (referred to as the minor axis). The preferred polarization is linearly polarized light where the light is polarized mostly along one axis (the major axis) with little or no polarization component along the minor axis. In this invention the polarized light has one or more wavelenghts of about from 150 to 2000 nm and preferably of about from 150 to 1600 nm and more preferably about from 150 to 800 nm. Most preferably, the polarized light has one or more wavelengths of about from 150 to 400 nm, and especially about from 300 to 400 nm. A preferred source of light is a laser, e.g., an argon, helium neon, or helium cadmium. Other preferred sources of light are mercury are deuterium and quartz tungsten halogen lamps, xenon lamps and black lights in combination with a polarizer. Polarizers useful in generating polarized light from nonpolarized light sources are interference polarizers made from dielectric stacks, absorptive polarizers and reflective polarizers based on Brewster reflection. With lower power lasers or when aligning small alignment regions, it may be necessary to focus the light beam onto the optical alignment layer.

By "exposing" is meant that polarized light is applied to the entire optical alignment layer or to a portion thereof. The light beam may be stationary or rotated. Exposures can be in one step, in bursts, in scanning mode or by other methods. Exposure times vary widely with the materials used, etc., and can range from less than 1 msec to over an hour. Exposure may be conducted before or after contacting the optical alignment layer with the liquid crystal medium. Exposing can be accomplished by linearly polarized light transmitted through at least one mask having a pattern or with a beam of linearly polarized light scanned in a pattern. Exposing also may be accomplished using interference of coherent optical beams forming patterns, i.e., alternating dark and bright lines.

Exposure energy requirements vary with the formulation and processing of the optical alignment layer prior and during exposure. For example, materials that possess high glass transition temperatures can have higher energy density requirements for optical alignment. Whereas, material systems designed to have a low glass transition temperature prior to exposure can have lower energy density requirements. A preferred range of exposure energy is about from 0.001 to 2000 J/cm$^2$. More preferred is the range of about from 0.001 to 100 J/cm$^2$ and most preferred range of exposure energy is about from 0.001 to 5 J/cm$^2$. Lower exposure energy is most useful in large scale manufacturing of optical alignment layers and liquid crystal display elements. Lower exposure energy also minimizes the risk of damage to other materials on the substrates.

The efficiency of the alignment process, and the exposure energy required, may be further impacted by heating, beyond that inherent in the "exposing" step. Additional heating during the exposing step may be accomplished by conduction, convection or radiant heating, or by exposure to unpolarized light. Additional heating may increase the mobility of the molecules during exposure and improve the alignment quality of the optical alignment layer. Additional heating is not a requirement of the process of the invention but may give beneficial results.

Exposing also can consist of two or more exposure steps wherein the conditions of each step such as angle of incidence, polarization state, energy density, and wavelength are changed. At least one of the steps must consist of exposure with linearly polarized light. Exposures can also be localized to regions much smaller than the substrate size to sizes comparable to the entire substrate size. A preferred method of dual exposing comprises a two step process of:

(a) exposing at least one optical alignment layer to polarized light at a normal incidence, and (b) exposing the optical alignment layer to polarized light at an oblique incidence.

Another preferred method of dual exposing comprises a two step process of:

(a) exposing said optical alignment layer to polarized light of a first direction of linear polarization of the incident light and (b) exposing said optical alignment layer to polarized light of a second direction of linear polarization of the incident light.

Another preferred method of dual exposing comprises a two step process of:

(a) exposing said optical alignment layer to polarized light of a first direction of linear polarization of the incident light, and (b) exposing said optical alignment layer to polarized light of a second direction of linear polarization of the incident light, at an oblique incidence.

Applying a liquid crystal medium to the optical alignment can be accomplished by capillary filling of a cell, by casting of a liquid crystal medium onto an optical alignment layer, by laminating a preformed liquid crystal film onto an optical alignment layer or by other methods. Preferred methods are capillary filling of a cell and casting of a liquid crystal medium onto an optical alignment layer. Optical alignment layers are pre-exposed to polarized light or the are exposed after contacting the liquid crystal medium.

A cell can be prepared by using two coated substrates to provide a sandwiched layer of liquid crystal medium. The pair of substrates can both contain optical alignment layers or a conventional alignment layer (e.g., mechanically buffed) can be used as the second alignment layer comprising the same or a different polymer.

As liquid crystal substances used for liquid crystal optical elements, nematic liquid crystal substances, ferroelectric liquid crystal substances, etc. are usable. Useful liquid crystals for the invention described herein include those described in U.S. Pat. No. 5,032,009 and new superfluorinated liquid crystals exemplified by ZLI-5079, ZLI-5080, ZLI-5081, ZLI-5092, ZLI-4792, ZLI-1828, MLC-2016, MLC-2019, MLC-6252, and MLC-6043 available from EM Industries, Hawthorne, N.Y. Also useful are guest-host formulations prepared with all types of liquid crystals and anisotropically absorbing dyes as described in U.S. Pat. No. 5,032,009. Also useful in this invention are nematic and ferroelectric liquid crystals that are disclosed in U.S. Pat. No. 5,447,759 entitled "Liquid Crystal Alignment Film and Liquid Crystal Display Elements," hereby incorporated by reference.

Chiral dopants are often added to these liquid crystals to induce a twist in one direction, in the liquid crystal medium. Left and right handed chiral dopants are available. Typical examples are ZLI-811, S-1011 and R-1011, all available from EM Industries.

Other liquid crystals useful in this invention include the polymerizable liquid crystals as described in U.S. Pat. No.

5,073,294 and the liquid crystal difunctional methacrylate and acrylate monomers as described in U.S. Pat. No. 4,892,392. Both patents are hereby incorporated by reference.

Still other liquid crystals useful in this invention include the liquid crystal polymers described in U.S. Pat. No. 5,382,548 which is hereby incorporated by reference. These polyester and polyurethane liquid crystal polymers have low rotational viscosities between their glass transition ($T_g$) and their isotropic transition ($T_{ni}$) and readily respond to surface aligning forces.

Preferred liquid crystals for the invention are nematic liquid crystals, ferroelectric liquid crystals, polymerizable nematic liquid crystals and nematic liquid crystalline polymers. Especially preferred liquid crystal for the invention are nematic liquid crystal and polymerizable nematic liquid crystals. Specific families of nematic liquid crystals that are preferred are the 4-cyano-4'-alkylbiphenyls, 4-alkyl-(4'-cyanophenyl)cyclohexanes and the superfluorinated liquid crystal mixtures selected from the group consisting of ZLI-5079, ZLI-5080, ZLI-5081, ZLI-5092, ZLI-4792, ZLI-1828, MLC-2016, MLC-2019, MLC-6252, and MLC-6043 commercially available from EM Industries, Hawthorne, N.Y.

The exposed optical alignment layer induces alignment of a liquid crystal medium at an angle + and −0 with respect to the direction of the linear polarization of the incident light beam and along the plane of the optical alignment layer. One skilled in the art will recognize that the process of the instant invention allows control of the alignment of a liquid crystal medium in any desired direction within the plane of the optical alignment layer by controlling the conditions of the polarized light exposure. Preferably the liquid crystal medium is aligned at an angle + and −0, where θ is equal to about 90° to the polarization direction.

An important feature of this invention is that after the process is completed the liquid crystal medium has "memory", i.e., will maintain the alignment which is induced by the linear polarization of the incident light source. The liquid crystal medium also can be realigned to the original or a third alignment by the process of this invention.

The alignment characteristics attainable with various formulations and the process of the invention are described in the accompanying examples. One interesting and useful feature of the alignment process of the invention is that, in general, very low pre-tilt angles, usually within 0 to 0.3 degrees are observed. With mechanically rubbed alignment layers the liquid crystal molecules in contact with the alignment layer align parallel to the buffing direction, but usually not exactly parallel to the substrate. The liquid crystal director is slightly titled from the substrate, for instance by about 2–10 degrees. Thus, in liquid crystal display applications where a minimum pre-tilt is desired the process of this invention becomes especially useful.

The process of the invention and the novel optical alignment layers of this invention can be used to make a novel liquid crystal optical elements, also of this invention. The novel optical elements include human and machine readable liquid crystal display elements, electro-optical light modulators, all optical light modulators, erasable read/write optical data storage media, image storage media, and diffractive optical elements, both passive and active, including gratings, beamsplitters, lenses, Fourier processors, optical disc and laser diode radiation collimators. Several of these optical elements are described in greater detail in U.S. Pat. No. 5,032,009, in columns 7 and 8 and in examples 19–21, which is hereby incorporated by reference. Detailed description of a liquid crystal display element and an optical data storage medium of the invention follow herein.

DISPLAY ELEMENT

A liquid crystal display element made by the process of the instant invention is composed of an electrode substrate having at least one optical alignment layer, a voltage-impressing means and a liquid crystal material. FIG. 1 illustrates a typical liquid crystal display element, comprising a transparent electrode 2 of ITO (indium-tin-oxide) or tin oxide on a substrate 1 and optical alignment layers 3 formed thereon. The optical alignment layers are exposed to polarized light of a wavelength or wavelengths within the absorption band of the anisotropically absorbing molecules. A spacer concurrently with a sealing resin 4 is intervened between a pair of optical alignment layers 3. A liquid crystal 5 is applied by capillary filling of the cell and the cell is sealed to construct a liquid crystal display element. Substrate 1 may comprise an overcoat film such as an insulating film, a color filter, a color filter overcoat, a laminated polarizing film etc. These coatings and films are all considered part of the substrate 1. Further, active elements such as thin film transistors, a nonlinear resistant element, etc. may also be formed on the substrate 1. These electrodes, undercoats, overcoats, etc. are conventional constituents for liquid crystal display elements and are usable in the display elements of this invention. Using the thus formed electrode substrate, a liquid crystal display cell is prepared, and a liquid crystal substrate is filled in the space of the cell, to prepare a liquid crystal display element in combination with a voltage-impressing means.

OPTICAL DATA STORAGE MEDIUM

Figure 6:
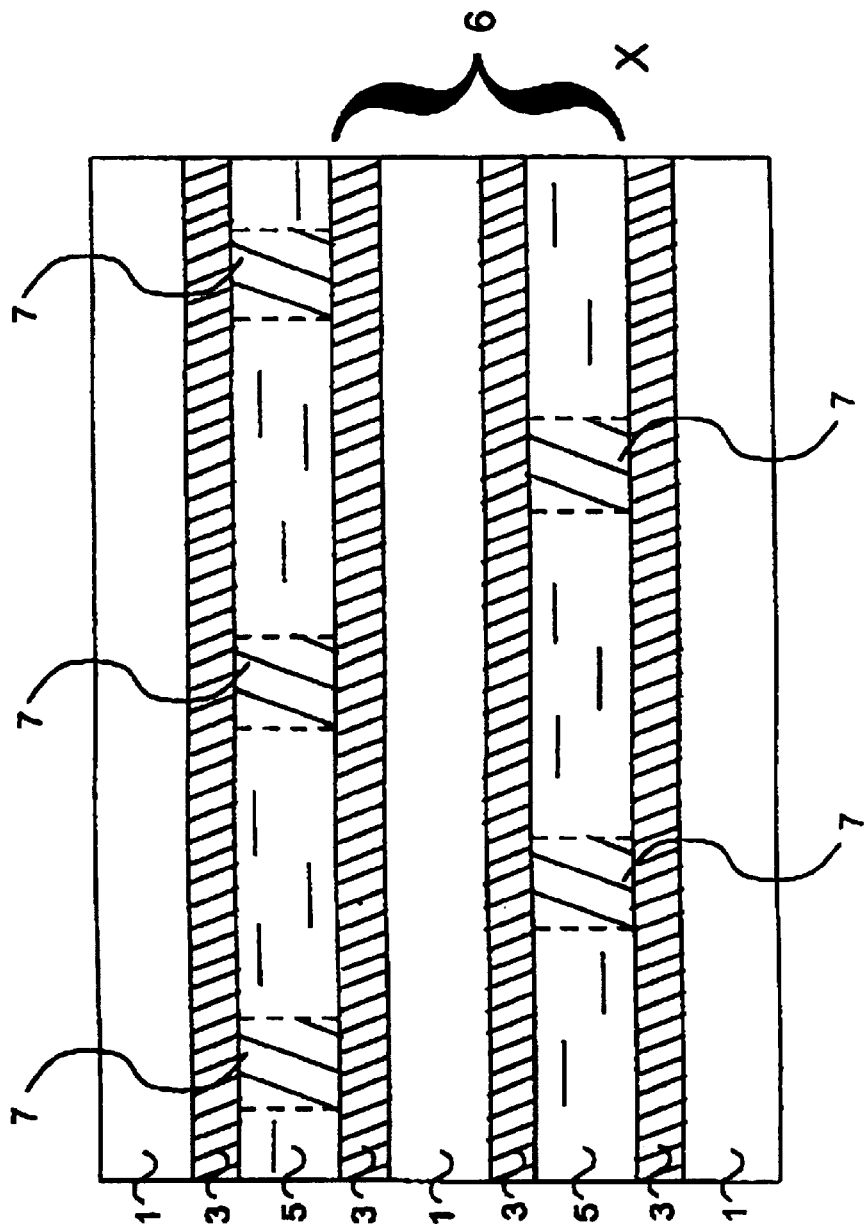
FIG. 6 is a cross section illustrating the basic construction of an optical storage medium.

An optical data storage medium with gray scale capability can be prepared by the process of the invention. A construction of an optical data storage medium is illustrated in FIG. 6 and discussed further below. To understand the storage medium construction several elements are defined as follows:

"Alignment layer pairs" herein refers to two alignment layers that control the alignment of the same liquid crystal layer.

"Alignment region" refers to a continuous area of a liquid crystal layer that has the same alignment state. The alignment region can be between 0.01 and $10^6$ $\mu m^2$ ($\mu m$ equals micrometer). Preferred alignment regions range in size from 0.1 to $10^6$ $\mu m^2$. Most preferred alignment regions range in size from 0.1 to 100 $\mu m^2$. In the liquid crystal technology, alignment regions as defined herein are often referred to as "domains". However, in information storage technology a domain is used to describe any uniform area (bubble, colored spot, reflective surface, etc.) that defines an information bit. Herein alignment region will be used as defined above and domain will be used to describe uniform areas in storage media other than liquid crystal media.

"Alignment states" refers to three distinct types of alignment: birefringent alignment, twist alignment, and combination alignment. Each type of alignment possesses the capability for three or more discreet, distinguishable states. Each alignment region within a liquid crystal layer of this invention takes on a type of alignment and a discreet alignment state. All alignment regions do not have to possess unique alignment states. The same alignment state may occur many times in different alignment regions through a liquid crystal layer.

Figure 2:
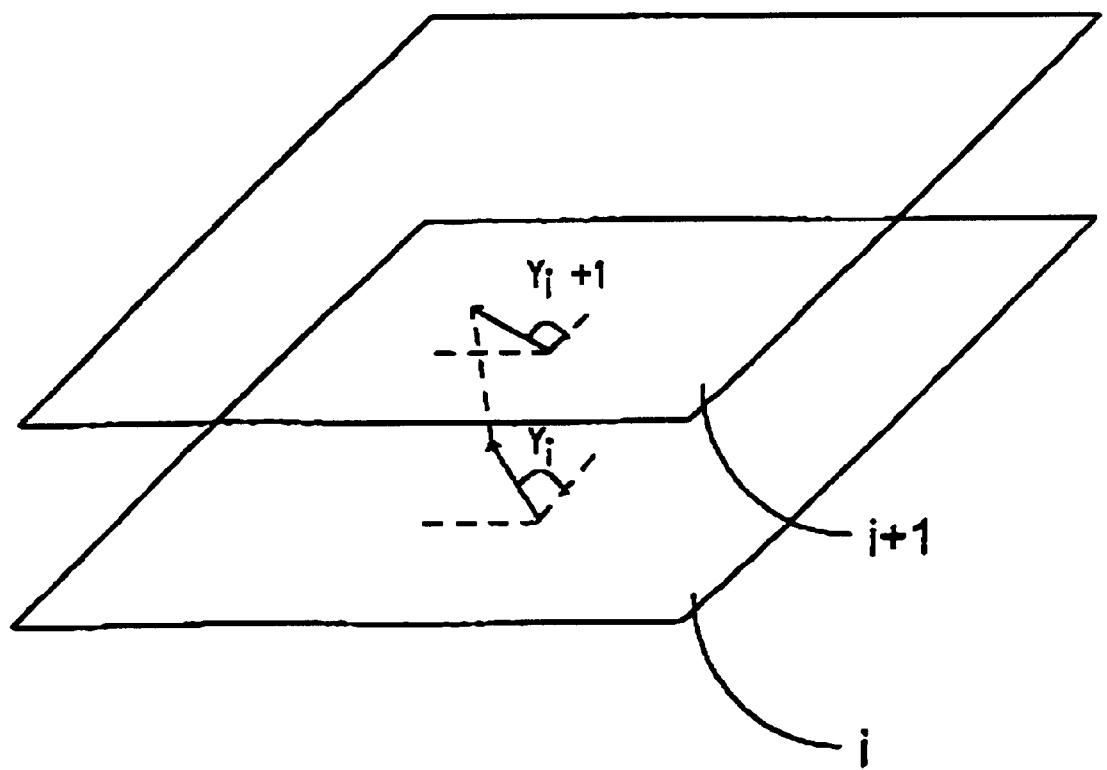
FIG. 2 illustrates the variation in director angle between plane i and i+1 for a twisted alignment state.

By a "twist alignment state" is meant the alignment regions differ by a change in twist. By "twist" or "twisted alignment" is meant that the direction of the local alignment of the liquid crystal layer between an alignment layer pair varies in a continuous fashion from one alignment layer to the other. As illustrated in FIG. 2, the projected director angle in the plane of alignment layer I, $\gamma_i$, is different from the projected director angle in the plane of alignment layer i+1, $\gamma_{i+1}$, and, as a result, the local liquid crystal projected director continuously changes form $\gamma_i$ to $\gamma_{i+1}$ creating a twist structure in the liquid crystal layer. For this invention, the twist angle, $\gamma_1 = \gamma i+1_{-i}$, can vary from −360 degrees to 360 degrees. To get greater than a 90° or less than −90° twist angle, a chiral dopant such as CB-15 (EM Chemicals, Hawthorne, N.Y.) is incorporated.

When the twisted angle, $\gamma_1$, is equal to zero, there is not twist in the liquid crystal medium and the medium is said to be parallel aligned. Most liquid crystal display applications currently use $\gamma_1$ equal to 90 or −90 degrees.

Figure 3:
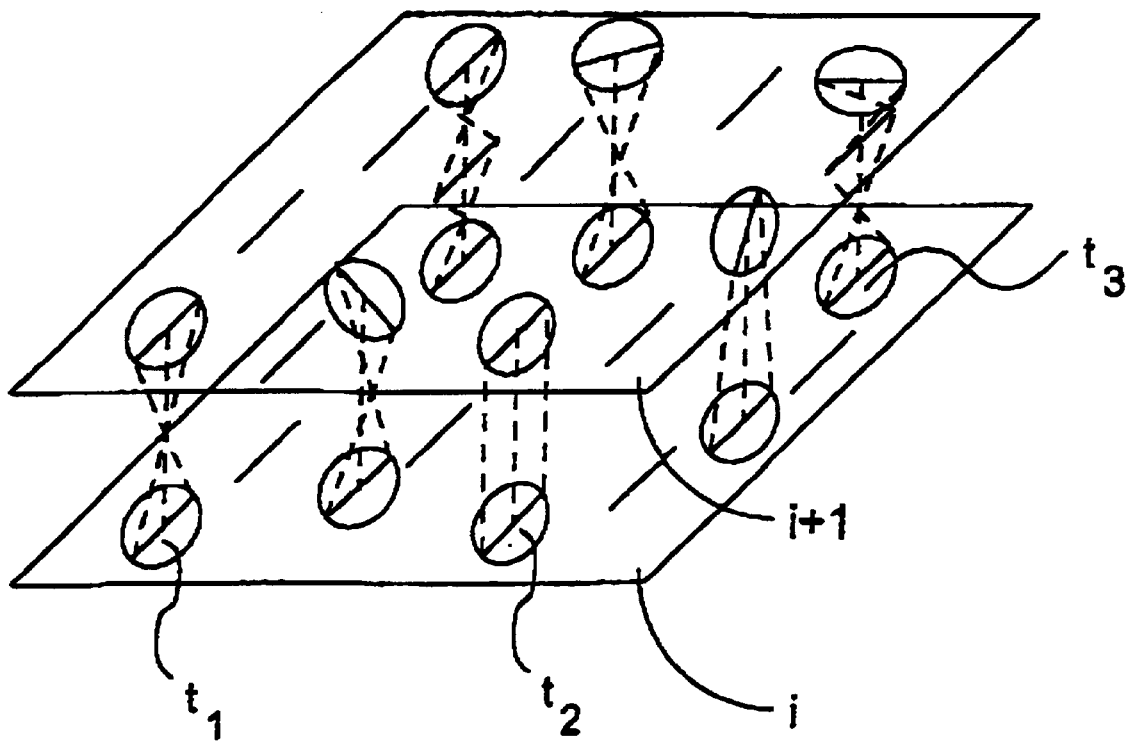
FIG. 3 illustrates several alignment regions with various twisted alignment states in a liquid crystal layer.

In a twisted alignment state each alignment region can have a twist other than zero and the twist value varies from region to region. It is further stipulated that the projection of the local liquid crystal director onto one alignment layer is in the same direction for all domains at that alignment layer, whereas the projection of the local liquid crystal director on the second alignment layer varies in direction for each alignment region to create the variation in twist value. FIG. 3 illustrates a liquid crystal layer having several alignment regions with variations in twist value. The solid lines within each alignment region at the planes i and i+1 indicate the director of the liquid crystal at that plane. The dashed lines indicate how the director rotates in proceeding from one plane to the other. For instance region $t_1$ has a 180° twist value, $t_2$ has a 0° twist value and $t_3$ has a 270° twist value.

FIG. 3 is a composite mean to demonstrate the wide variation in twist angles available by control of the optical alignment layer. As mentioned above, to get greater than a 90° twist or less than a −90° twist a chiral dopant is required to induce a twisted nematic structure in the liquid crystal medium. In the normal case where a uniform concentration of chiral dopant is present the liquid crystal medium will have a uniform pitch. This pitch will determine the range, within which, the variation in twist angle induced by the optical alignment process will occur. If the uniform concentration of chiral dopant is present which gives a uniform twist angle of $\gamma_1$, then the range of twist variation that can be controlled optically is $\gamma_1 \pm 90°$. For example, if the chiral dopant concentration is chosen to give $\gamma_1 = 270°$ then the range of optically controlled twist variation would be 180° to 360°.

Figure 4:
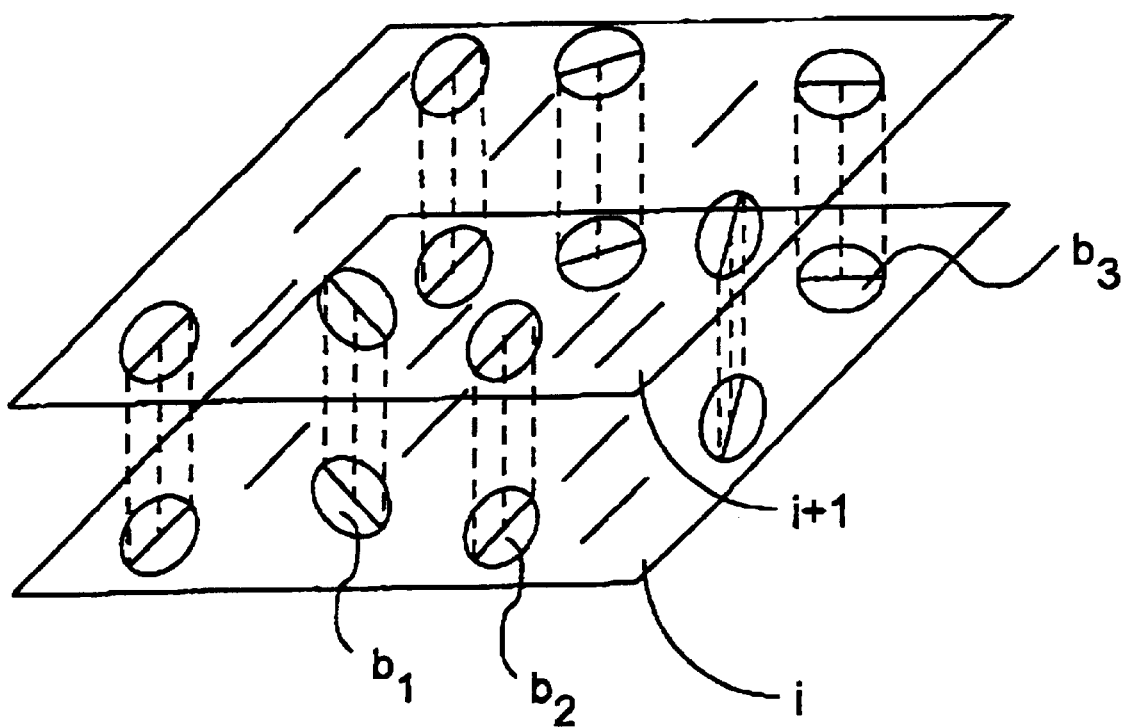
FIG. 4 illustrates several alignment regions with various birefringent alignment states in a liquid crystal layer.

By a "birefringent alignment state" is meant the alignment regions in a liquid crystal layer differ by a change in birefringence. Each alignment region has zero twist ($\gamma_1 = 0$ degrees) but the projection of the liquid crystal director onto the alignment layer varies in direction for each alignment region. A liquid crystal layer with several birefringent alignment states is illustrated in FIG. 4. Alignment regions $b_1$, $b_2$ and $b_3$ have various directors of the local alignment relative to the background alignment in plane, i, 60°, 0° and 90°, respectively.

Figure 5:
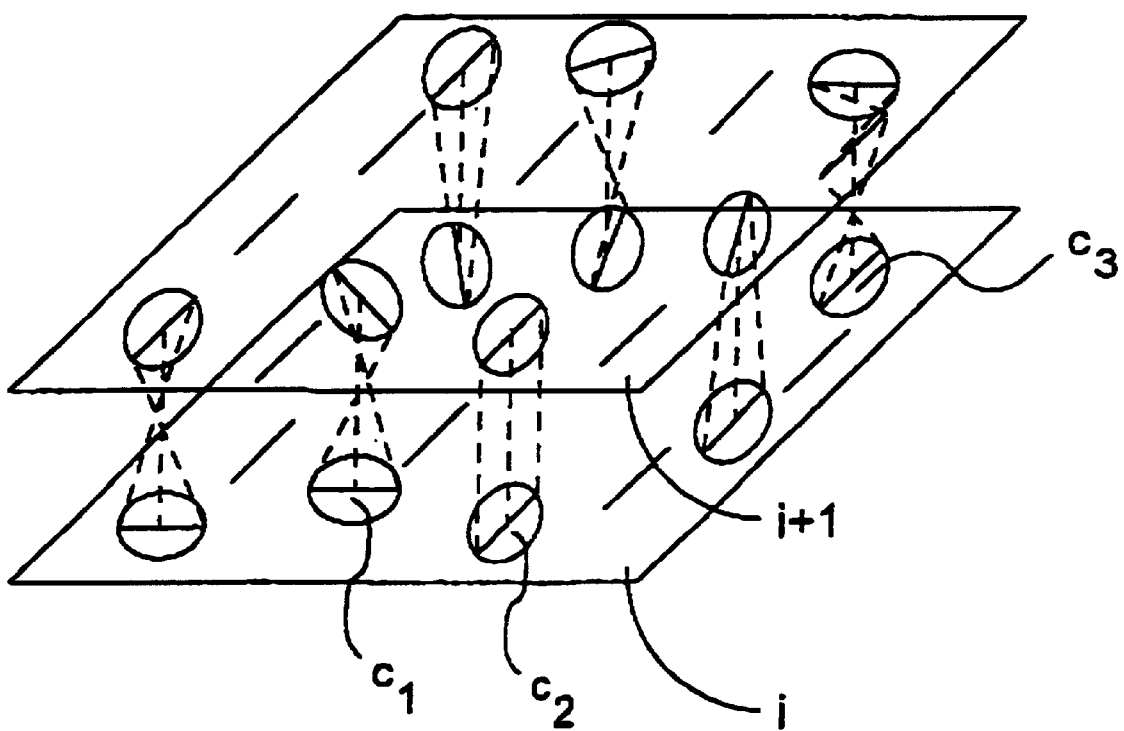
FIG. 5 illustrates several alignment regions with various combination alignment states in a liquid crystal layer.

By a "combination alignment state" is meant that one or more alignment region in the liquid crystal layer differs by a change in twist and birefringence. Thus, for each alignment region, the twist can vary in magnitude and the projection of the local liquid crystal director onto each alignment layer can vary in direction. FIG. 5 illustrates a liquid crystal alignment layer with several alignment regions with different combination alignment states. The projection of the local liquid crystal director onto both alignment layers may be different. Alignment regions $c_1$, $c_2$ and $c_3$ all have different twist values and different directors of the local alignment. For instance, $c_1$ has a 45° twist and a 90° change in director relative to the background alignment of i; $c_2$ has a 0° twist and a 0° change in director; and $c_3$ has a 270° twist and a 0° change in director. Again, the range of the twist angle for each liquid crystal layer depends upon the pitch of the liquid crystal medium.

By "grayscale" is meant that each domain in the optical storage medium can be encoded with three or more values. For example, if each domain can be encoded with N possible values (where N is an integer), then each domain must have N distinct states that are measured by the detection system suitable for the particular application. The size of N is determined by the sensitivity of the optical storage medium and/or the sensitivity of the detection system.

Traditionally, the N possible values are represented as a power of two. If there are N=16 possible values, the 16 values (thus 16 distinct states for each domain in the media) would be represented as $2^4$ and called 4 bit grayscale. The term bit represents the power of two required to get the total possible values. For example, 0 bit would represent 1 possible encoded value, 1 bit=2 possible encoded values, . . . j bit=$2^j$ possible encoded values.

In most applications of optical storage media, the distinct states of each domain cause a variation in the transmitted or reflected flux of light incident onto a light sensitive detector. For each distinct state there is a distinct light level transmitted or reflected. Solid state detectors based on semiconductors, and the human eye are a few examples of light sensitive detectors. Each detection system must process the transmitted or reflected light signals into information useful for interpretation.

In the case of solid state detectors, electronic processing converts the light flux level to a binary number (power of two) that is interpreted by a computer. The computer processes the binary number from each domain either serially (one domain at a time) or in parallel (multiple domains at a time) and derives the information it needs to perform the programmed task.

In the case of the human eye, the distinct light levels for each domain are processed in parallel by the brain to create a photographic image. Each domain by itself is not very meaningful to the brain but the sum total of all the transmitted or reflected light levels from each domain result in meaningful information that is interpreted by the brain.

Most optical storage mediums demonstrate only one bit of information can be recorded in a single domain. As a consequence, only two distinct states are possible (i.e., a 0 or 1 in a binary number system). Therefore, to store the number 16 in this medium, four domains would be needed. However, if each domain had 16 distinct states then a single domain could be used to store the same number that required four domains in the 1 bit medium. Thus, we have effectively increased the storage density by four times. Carrying this argument to its logical conclusion, if $2^k$ detectable states were available for each domain, the storage density of the medium would increase by k times.

In the context of the present invention, each liquid crystal alignment region in the optical storage medium can be encoded with a distinct birefringent alignment state, twist alignment state, or a combination alignment state. If polarized light is transmitted or reflected through the medium and then passed through a polarizer the distinct alignment state would change the light level detected. For example, if the twist alignment state is used for each alignment region, there is a distinct light level detected for twist alignment states with their twist value limited to one quadrant (0 to 90 degrees, 90 to 180 degrees, etc.) of a full 360 degree twist. For one quadrant and N distinct twist alignment states, there are 90/N possible light levels to be detected. Therefore each alignment region in the medium of the present invention is capable of grayscale. Similar arguments can be made for the birefringent and combination alignment states used in the present invention.

To obtain the desirable features of gray scale in a medium, greater than two alignment states are required. A preferred optical storage medium of the invention described herein has been 4 and 2000 alignment states.

FIG. 6 is a cross section illustrating the basic construction of an optical storage medium prepared by the process of the instant invention. A series of substrates 1 are coated with alignment layers 3 on one or both sides. The coated substrates then stacked in series and spaced appropriately with spacers (not shown). The series of substrates may be sealed at the perimeter (not shown), except for fill and exit ports, with a sealing compound to make a cell. The cell is then filled with a desired liquid crystal to provide liquid crystal layers 5, followed by sealing the fill and exit ports. Each additional dual coated substrate in the series allows for a repetition 6 comprising an additional liquid crystal layer. Repetitions may number from X=0 to about 20 and are only limited by the capability to address each liquid crystal layer.

As can be seen from FIG. 6, each liquid crystal layer has a corresponding alignment layers pair that controls the alignment of the liquid crystal layer. In this invention at least one of the alignment layers of each alignment layer pair is an optical alignment layer. Different alignment regions 7 of the liquid crystal layer have three or more alignment states that result in grayscale. In FIG. 6 the specific alignment states of the alignment regions 7 may be different twisted, birefringent, or combination alignment states, or a mixture of all three types of states, illustrated in FIGS. 3–5. The alignment states are controlled by exposure of selected regions of the optical alignment layer with polarized light. Each liquid crystal layer can be selectively addressed by matching the absorption characteristics of the corresponding optical alignment layer with the appropriate wavelength of polarized light. Exposure of the optical alignment layer with polarized light can be accomplished before or after construction of the cell and before or after contact with the liquid crystal medium.

Exposure of selected regions of one optical alignment layer, of an alignment layer pair, to polarized light while the other alignment layer remains fixed allows formation of twisted alignment states. Equal exposure of selected regions of two optical alignment layers, of an alignment layer pair, to polarized light gives a birefringent alignment state. When selected regions of two optical alignment layers of an alignment layer pair are differently exposed to polarized light, a combination alignment state is created.

This invention is demonstrated in the following examples, which are illustrative and not intended to be limiting.

EXAMPLE 1

This example illustrates the optical process for aligning liquid crystals using a homopolyimide of one structural element of formula IIa.

A mixture of 3,3',4,4'-benzophenonetetracarboxylic dianhydride, D1, (322 mg, 1.0 mmol, 98 wt %), 2-trifluoromethyl)-1,4-benzenediamine, 1, (176 mg, 1.0 mmol) and γ-butyrolactone (7.0 mL) was stirred at room temperature for 16 h under a nitrogen atmosphere. The solution was diluted to a 3 wt % solution by addition of γ-butyrolactone (7.4 mL), filtered through a 0.45 μm teflon filter and spin coated onto soda-lime glass substrates (0.9"× 1.2") at 2500 rpms. The coated substrates were dried at 80° C. for 0.25 h and 180° C. for 1 h in a nitrogen atmosphere and stored in a nitrogen atmosphere at room temperature until used.

Figure 7:
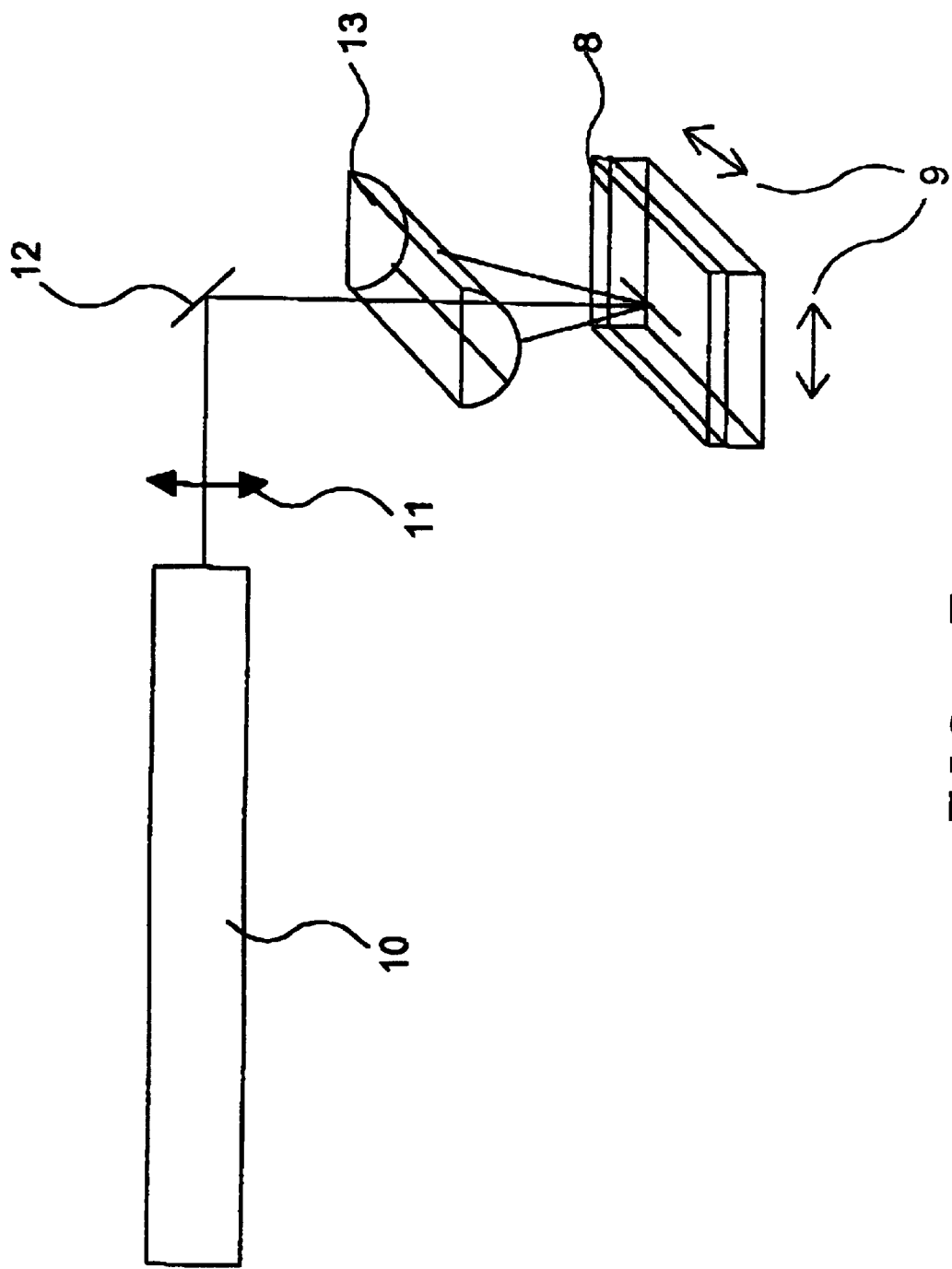
FIG. 7 shows a system which can be used to expose coated substrates to ultraviolet light.

The coated substrates were exposed to ultraviolet polarized light using the set-up schematically represented in FIG. 7. In this experiment each coated substrate 8 was mounted onto a 2-axis XY translation stage (indicated by double-headed arrows 9 in FIG. 7) with the coated side facing the incident laser beam. An Innova 400 (Coherent Incorporated, Santa Clara, Calif.) laser 10 was tuned to laser in the ultraviolet with wavelengths ranging from 308 to 336 nm. The 1 cm polarized beam 11 was directed with mirror 12 to a 5 cm focal length cylindrical lens 13 which focused the incident 1 cm beam to a line (1 cm×200 μm) onto each coated substrate 8. The coated substrate was translated at a 0.5 mm/s constant speed along the Y direction and then stepped in the X direction. This was repeated until the coated substrate had been completely exposed. The incident optical power was 0.25 Watts and the ultraviolet light was polarized along 11.

A liquid crystal cell was constructed from the two exposed coated substrates. Mylar polyester strips (55 μm) were placed on one coated substrate and the other substrate was sandwiched on top of it. The optical alignment layers were facing each other and the background alignment directions were mutually parallel. The substrates were pressed to a 55 micrometer spacing using clamps, epoxy was applied along the edges and the epoxy was cured for 5 mins. Two spaces on opposite edges of the cell were left unsealed. One unsealed opening on the cell was dipped into MLC6043 nematic liquid crystal (EM Industries, Inc., Hawthorne, N.Y.). The cell filled by capillary action. After filling, the cell was removed from the liquid crystal, cleaned up, and the spaces sealed with epoxy.

The cell was viewed between crossed polarizers on a photographic light box. The background alignment direction was along one of the input polarizer's transmission axis. The input polarizer polarizes the light along the background alignment. The output polarizer blocks the transmission of the light since its transmission axis is crossed to the input polarizer's transmission axis. As a result, the background of the cell appeared uniformly dark except for occasional disclination lines indicated that the exposure of the coated substances induced the net uniform alignment of the liquid crystal sandwiched between the optical alignment layers.

In another trail two optical alignment layers were treated identically as described above except that the coated substrates were translated at a 1.5 mm/s constant speed along the Y direction and then stepped in the X direction (e.i. higher can rate). The same results between crossed polarizers were observed as described above.

In another trial two optical alignment layers were treated identically as described in the first trial except that nitrogen gas was blown across the substrates during exposure to reduce the oxygen levels to less than 0.3% (measured using Sensidyne Oxytec Mini Monitor, Model GOA-2H, Clearwater, Fla.). The same results between crossed polarizers were observed as as described above. Thus, exposure under a nitrogen purge had no effect on the outcome of the trial.

EXAMPLE 2

This example further illustrates the optical process for aligning liquid crystals using a homopolyimide of one structural element of formula VII.

A mixture of dianhydride D1 (161.1 mg, 0.50 mmol, 98 wt %), 4,4'-diaminobenzophenone (106.1 mg, 0.50 mmol, Aldrich) and γ-butyrolactone (2.40 g) was stirred at room temperature for 16 h under a nitrogen atmosphere. The solution was diluted to a 3 wt % solution by addition of γ-butyrolactone (6.23 g), filtered through a 0.45 μm teflon filter and spin coated onto soda-lime glass substrates (0.9"× 1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. The same results between crossed polarizers were observed as in Example 1.

In another trial two optical alignment layers of this example were exposed prior to assembly of the cell and at a higher scan rate. The above treatment was repeated except the scan rate was chosen to be 1.5 mm/sec. The same results between crossed polarizers were observed as described above.

EXAMPLE 3

This example illustrates the formation and use of novel compositions of this invention consisting essentially of copolyimide with three or more diamines derived from formulas IIa.

A mixture of dianhydride D1 (161.1 mg, 0.05 mmol), diamines 1 (44.0 mg, 0.25 mmol), 2 (22.0 mg, 0.125 mmol), 5 (40.0 mg, 0.125 mmol) and γ-butyrolactone (3.28 g) was stirred 16 h at room temperature under a nitrogen atmosphere. Triethylamine (0.35 mL, 2.5 mmol) and a solution of acetic anhydride (0.142 mL, 1.5 mmol) in γ-butyrolactone (0.9 g) were added sequentially, and the mixture was heated to 120° C. for 2.25 h. The solution was cooled to room temperature, diluted to a 3 wt % solution by addition of γ-butyrolactone (4.04 g), filtered through a 0.45 μm teflon filter and spin coated onto soda-lime glass substrates (0.9"× 1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. The same results between crossed polarizers were observed as in Example 1. In addition, a few regions of slightly different contrast were observed when the analyzer was adjusted slightly less or greater than 90 degrees (slightly uncrossed from the polarizer) which is due to the flow of the liquid crystal during filling. These were will call flow defects. However, as in Example 1, the background of the cell was predominately dark between crossed polarizers indicating that the exposure induced the net uniform alignment the liquid crystal scandwiched between the optical alignment layers of this example.

In another trial two optical alignment layers of this example were exposed prior to assembly of the cell and at a higher scan rate. The above treatment was reported except the scan rate was chosen to be 1.5 mm/sec. The same results between crossed and slightly uncrossed polarizers were observed as described above.

EXAMPLE 4

This example illustrates the formation and use of novel compositions of this invention consisting essentially of a copolyimide with structures of formula IIa and VII.

A mixture of dianhydride D1 (161.1 mg, 0.5 mmol), diamines 1 (35.2 mg, 0.20 mmol), 2 (22.0 mg, 0.125 mmol), 5 (40.0 mg, 0.125 mmol), 11 (10.6 mg, 0.05 mmol) and γ-butyrolactone (1.78 g was stirred 16 h at room temperature under a nitrogen atmosphere. Triethylamine (0.21 mL, 1.5 mmol) and a solution of acetic anhydride (0.142 mL, 1.5 mmol) in -butyrolactone (0.80 g) were added sequentially, and the mixture was heated to 120° C. for 3.0 h. The solution was cooled to room temperature, diluted to a 3 wt % solution by addition of γ-butyrolactone (6.61 g), filtered through a 0.45 μm teflon filter and spin coated onto soda-lime glass substrates (0.9"×1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. The same results between crossed polarizers were observed as in Example 1. Some small regions of different alignment (which we call domains) were also observed between the crossed polarizers. However, as in Example 1, the background of the cell was predominately dark between crossed polarizers indicating that the exposure induced the net uniform alignment of the liquid crystal scandwiched between the optical alignment layers of this example.

In another trial two optical alignment layers of this example were exposed prior to assembly of the cell and at a higher scan rate. The above treatment was repeated except the scan rate was chosen to be 1.5 mm/sec. The same results between crossed polarizers were observed as described above. In addition, a few flow defects were observed in this cell. However, as in Example 1, the background of the cell was predominately dark between crossed polarizers indicating that the exposure induced the net uniform alignment of the liquid crystal scandwiched between the optical alignment layers of this example.

EXAMPLE 5

This example illustrates the formation of novel compositions of this invention consisting essentially of a copolyimide of at least one structural element of formula IIa and Va.

To a mixture of diamine 1 (88.0 mg, 0.50 mmol) and γ-butyrolactone (2.4 mL) was added 5-(2,5-dioxotetrahydro)-3-methyl-3-cyclohexene-1,2-dicarboxylic anhydride, D3, (66.0 mg 0.25 mmol) and the mixture stirred at room temperature for 3.5 h under a nitrogen atmosphere. Dianhydride D1 (80.6 mg, 0.25 mmol, 98wt %) was added and the mixture heated to 50° C. for 11 h and 80° C. for 2.5 h. The mixture was cooled to 40° C., triethylamine (0.35 mL, 2.5 mmol) and a solution of acetic anhydride (0.142 ml., 1.5 mmol) in γ-butyrolactone (0.9 mL) were added sequentially, and the mixture was heated to 120° C. for 2.5 h. The solution was cooled to room temperature, diluted to a 3 wt % solution by addition of γ-butyrolactone (3.1 mL), filtered through a 0.45 μm teflon filter and spincoated onto soda-lime glass substrates (0.9"×1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. The same results between crossed polarizers were observed as in Example 1.

In another trial two optical alignment layers of this example were exposed prior to assembly of the cell and at a higher scan rate. The above treatment was repeated except the scan rate was chosen to be 1.5 mm/sec. The same results were observed as described above except that flow defects were also observed.

EXAMPLE 6

This example illustrates the formation of novel compositions of the invention.

To a mixture of diamine 11 (106 mg, 0.50 mmol) and γ-butyrolactone (1.16 g) was added 1,2,3,4-butanetetracarboxylic dianhydride, D7, (99.0 mg, 0.50 mmol) and the mixture stirred at room temperature 16 h under a nitrogen atmosphere. Triethylamine (0.209 mL, 1.5 mmol) and a solution of acetic anhydride (0.142 mL, 1.5 mmol) in γ-butyrolactone (1.0 g mL) were added sequentially, and the mixture was heated to 120° C. for 3 h. The solution was cooled to room temperature, diluted to a 3 wt % solution by addition of γ-butyrolactone (4.16 g), filtered through a 0.45 µm teflon filter and spin coated onto soda-lime glass substrates (0.9"×1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. In addition, ZL14792 (EM Industries, Inc., Hawthorne, N.Y.) liquid crystal was used instead of MLC6043. The same results between crossed polarizers were observed as in Example 1 except that some flow defects were also observed when the polarizers were slightly uncrossed.

EXAMPLE 7

This example illustrates the formation and use of novel compositions of this invention consisting essentially of a copolyimide with at least one structural element of formula VII and VIII.

A mixture of anhydride D3 (99.0 mg, 0.375 mmol), 4,4'-diaminobenzophenone (106.1 mg, 0.50 mmol, Aldrich) and γ-butyrolactone (1.39 g) was stirred for 10 min under a nitrogen atmosphere. Dianhydride D1 (40.3 mg, 0.125 mmol) was added and the mixture stirred at room temperature. Triethylamine (0.35 mL, 2.5 mmol) and a solution of acetic anhydride (0.142 mL, 1.5 mmol) in γ-butyrolactone (1.31 g) were added sequentially, and the mixture was heated to 120° C. for 3.0 h. The solution was cooled to room temperature diluted to a 3 wt % solution by addition of γ-butyrolactone (4.92 g), filtered through a 0.45 µm teflon filter and spin coated onto soda-lime glass substrates (0.9"×1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. The same results between crossed polarizers were observed as in Example 1 except that some flow defects were also observed when the polarizers were slightly uncrossed.

In another trial two optical alignment layers of this example were exposed prior to assembly of the cell and at a higher scan rate. The above treatment was repeated except the scan rate was chosen to be 1.5 mm/sec. The same results were observed as described above except that no flow defects were observed.

EXAMPLE 8

This example illustrates the formation and use of novel compositions of this invention consisting essentially of a copolyimide with at least one structural element of formula VIII and IX.

To a solution of 4,4'-diaminobenzophenone, 11, (106.1 mg, 0.50 mmol) and γ-butyrolactone (1.60 g) was added 5-(2,5-dioxotetrahydro)-3-methyl- 3-cyclohexene-1,2-dicarboxylic anhydride, D3, (66.0 mg, 0.25 mmol), followed immediately by addition of 1,1,1,3,3,3-hexafluoro-2,2-bis(3,4-dicarboxyphenyl)propane dianhydride, D2, (111.1 mg, 0.25 mmol). The mixture was stirred at room temperature for 16 h under a nitrogen atmosphere. A solution of acetic anhydride (0.142 mL, 1.5 mmol) in γ-butyrolactone (1.0 g mL) and triethylamine (0.209 mL, 1.5 mmol) and were added sequentially, and the mixture was heated to 120° C. for 3 h. The solution was cooled to room temperature, diluted to a 3 wt % solution by addition of γ-butyrolactone (6.24 g), filtered through a 0.45 µm teflon filter and spin coated onto soda-lime glass substrates (0.9"×1.2") at 2500 rpms. The coated substrates were dried at 80° C. for 0.25 h and 180° C. for 1 h in a nitrogen atmosphere and stored in a nitrogen atmosphere at room temperature until used.

Example 1 was repeated except the glass substrates were coated with the polyimide of this example. The same results between crossed polarizers were observed as in Example 1 except that some flow defects were also observed when the polarizers were slightly uncrossed.

In another trial two optical alignment layers of this example were exposed prior to assembly of the cell and at a higher scan rate. The above treatment was repeated except the scan rate was chosen to be 1.5 mm/sec. The same results were observed as described above.

EXAMPLE 9

This example illustrates that the mechanical buffing process can be used for aligning liquid crystals using a homopolyimide of Example 1.

Coatings on soda-lime glass substrates were prepared using the same materials and procedures as described in Example 1.

A conventional method of mechanical buffing was used. Two coated substrates were mounted onto custom vacuum chuck made from a block of aluminum. The coated surfaces were face-up and a vacuum was pulled to hold the substrates in place. The vacuum chuck was inverted such that the coated surfaces were face down and subsequently placed on top of a fibrous Buehler polishing cloth. The coated surfaces were translated approximately 10 inches across the polishing cloth at a constant rate using only the weight of the vacuum chuck to hold them down onto the cloth. The buffing step was repeated one more time. The vacuum was released and the substrates blown off with 30–40 psi nitrogen gas to remove any particulate contamination.

A liquid crystal cell was constructed from the two rubbed substrates and filled with MLC6043 nematic liquid crystal as described in Example 1. The results were the same as Example 1 when the cell was viewed between crossed polars indicating a net alignment was induced by the mechanical buffing process.

EXAMPLE 10

This example illustrates that the mechanical buffing process can be used for aligning liquid crystals using a copolyimide of Example 4.

Coatings on soda-lime glass substrates were prepared using the copolyimide of Example 4. The coated substrates were processed as described in Example 9. The resulting liquid crystal cell showed the same results as Example 9 except there were no disclination lines visible in the cell.

EXAMPLE 11

This example illustrates the use of the polyimide of Example 1 in an optical storage medium.

A cell was prepared as in Example 1 using a 1.5 mm/s scan speed except that ZL14792 was used instead of MLC6043 to fill the cell. The completed cell was subsequently exposed through a metal mask with a 1 mm diameter hole in the center using the optical set-up described in Example 1. A total of four exposures at a power of 1 Watt and a scan speed of 0.01 mm/s were performed with the 1 mm hole placed in front of different areas of the cell to prevent overlap of the exposed regions. In each exposure the orientation of the light polarization in the plane of the cell substrates relative to the background alignment was changed by rotating the cell approximately 0, 22.5, 45, and 67.5 degrees. This resulted in the light polarization being approximately at 0, −22.5, −45, and −67.5 degrees, respectively, to the background direction. Since the optically induced alignment is perpendicular to the light polarization, the induced liquid crystal alignment was expected to be at approximately 90, 67.5, 45, and 22.5 degrees, respectively. In addition, since the UV light was defocussed as well as absorbed and reflected by the glass substrate and the liquid crystal, the power was substantially reduced at the back alignment layer (farthest from the incident light beam) relative to the power at the front alignment layer (closest to the incident light beam). This resulted in the liquid crystal at the front alignment layer changing orientation while little change occured at the back alignment layer. As a consequence, we observed, by placing the cell between polarizers and rotating the polarizer between the viewer and the cell, a twisted nematic orientation of the liquid crystal in the 1 mm exposed regions which corresponded to twist angles approximately equal to 90, 67.5, 45, and 22.5 degrees, respectively. In addition, the different orientations of the 1 mm exposed regions evidenced themselves by the increasing light transmission with increasing twist angle when the cell was viewed between crossed polarizers.

EXAMPLE 12

This example demonstrates that the polyimide of Example 1 can optically induce the alignment of liquid crystals when exposed to polarized ultraviolet lamp light.

Figure 8:
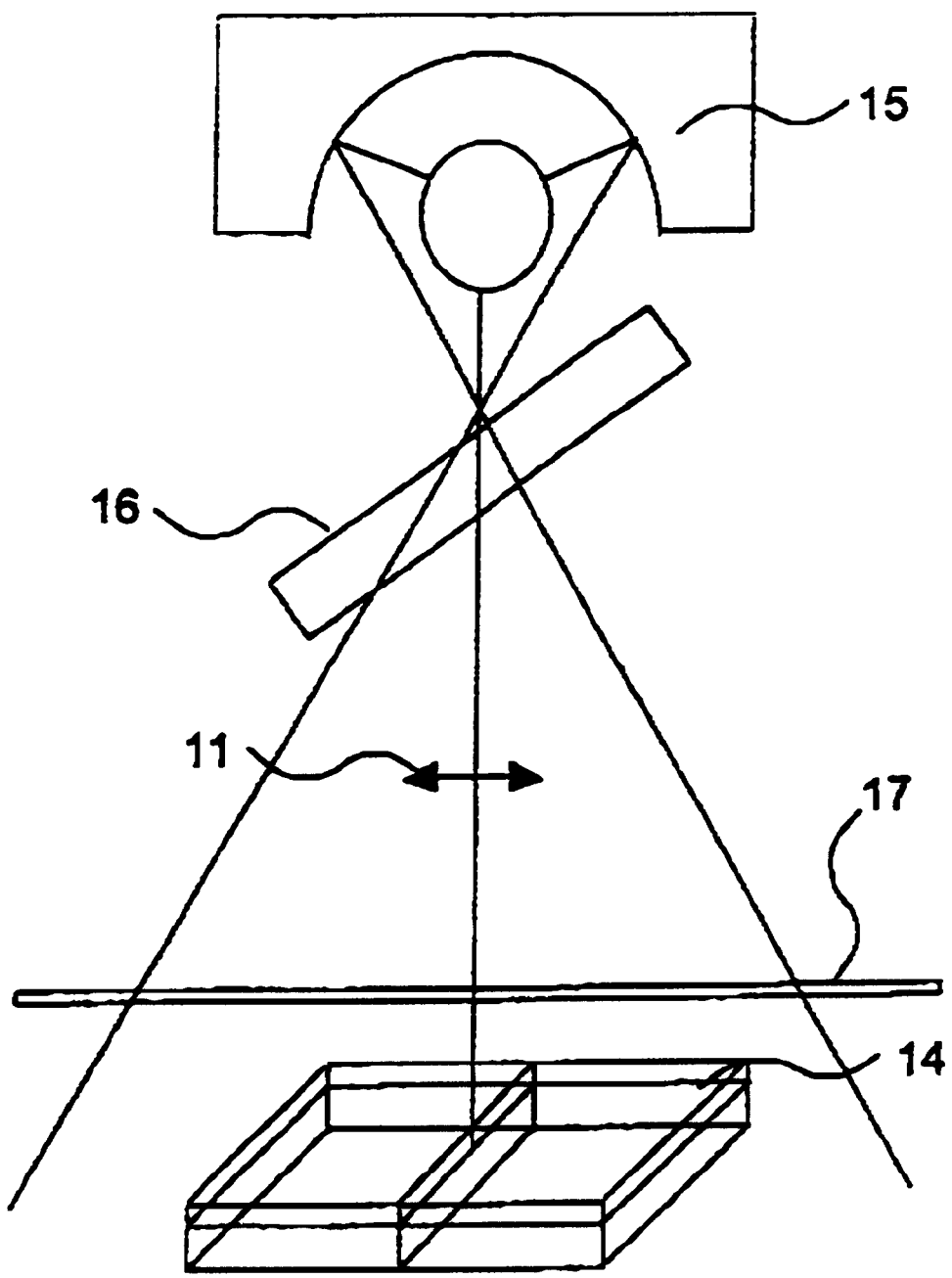
FIG. 8 shows a system which can be used to expose coated substrates with ultraviolet light from a UV lamp source.

Two substrates 14 coated with the polyimide of Example 1 were exposed by an ultraviolet lamp as depicted in FIG. 8. The ultraviolet lamp 15 (UV Process Supply, Chicago, Ill., Model Porta-Cure 1500F) was 16 cm from the substrates 14 with the coated side facing the lamp. A 3×4 inch dielectric polarizer 16 (CVI Laser Corporation, Albuquerque, N. Mex.) was placed in front of the light beam. The polarizer 16 gave approximately 20:1 of p-polarized light 11 to s-polarized light in transmission for wavelengths between 300–400 nm. The light was subsequently passed through a 1 mm thick soda lime glass plate 17 (Donnelly Mirrors, Inc., Holland, Mich.). The glass plate 17 has a cut-off of approximately 300 nm (transmission is less than 10% for any wavelength less than 300 nm). To prevent illumination of the coated substrates 14 from unpolarized stray light, aluminum foil (not shown in figure) was placed to block all light that did not pass through the polarizer 16. The output of the lamp 15 was set at 300 Watts/inch and allowed to warm-up for 10 minutes prior to placing the coated substrates 14 in front of the light beam.

The power density of the light beam at the substrates 14 was measured to be 14 milliwatts/cm$^2$ using a Control Cure compact radiometer from UV Process Supply, Chicago, Ill. The substrates were exposed for 10 minutes and a cell was assembled and filled as in Example 1 except that the liquid crystal used was ZL14792.

The results were the same as in Example 1 except for the presence of flow defects when the polarizers were slightly uncrossed. However, as in Example 1, the background of the cell was predominately dark between crossed polarizers indicating that the exposure induced the net uniform alignment of the liquid crystal sandwiched between the optical alignment layers of this example.

If the liquid crystal displays prepared according to each of the above Examples, after optically inducing alignment, are visually examined under 100X magnification between crossed polarizers, these liquid crystal displays will exhibit substantially no irregularities in alignment resulting from scratches, while liquid crystal display elements treated by mechanical buffing will exhibit substantial irregularities.

TABLE 1

| No. | Structure |
|---|---|
| | Diamines used in Polyimide Alignment Layers |
| 1 | $H_2N$—⌬($CF_3$)—$NH_2$ |
| 2 | $H_2N$—⌬($CF_3$)($H_2N$) |
| 3 | $H_2N$—⌬($CF_3$)—$NH_2$ ($H_2N$) |
| 4 | $H_2N$—⌬($OCF_3$)—$NH_2$ |
| 5 | $H_2N$—⌬($CF_3$)—⌬($F_3C$)—$NH_2$ |
| 6 | $H_2N$—⌬($OCF_3$)($F_3CO$)—⌬—$NH_2$ |

TABLE 1-continued

Diamines used in Polyimide Optical Alignment Layers

| No. | Structure |
|---|---|
| 7 | (biphenyl with H₂N, CF₃, F₃C, NH₂ substituents) |
| 8 | (benzene with OC₈H₁₇, NH₂, H₂N) |
| 9 | (benzene with OCH₃, H₂N, NH₂) |
| 10 | (benzene with H₃C, CH₃, H₂N, NH₂, H₃C, CH₃) |
| 11 | (H₂N—C₆H₄—C(=O)—C₆H₄—NH₂) |

TABLE 2

Alicyclic tetracarboxylic dianhydrides

| No. | Structure |
|---|---|
| D3 | (methyl-substituted bicyclic dianhydride) |
| D4 | (bicyclic dianhydride) |
| D5 | (cyclobutane tetracarboxylic dianhydride) |
| D6 | (bicyclopentane dianhydride) |
| D7 | (bis-succinic anhydride) |
| D8 | (bicyclic dianhydride) |
| D9 | (dianhydride with Si—O—Si, Me groups) |
| D10 | (tricyclic dianhydride) |
| D11 | (tricyclic dianhydride) |

We claim:

1. An optical element comprising at least one substrate, an optical alignment layer on a surface of the substrate and a liquid crystal layer on a surface of the optical alignment layer, wherein the optical alignment layer comprises anisotropically absorbing molecules consisting essentially of at least one diaryl ketone and is exposed to polarized light sufficient to align the liquid crystal layer.

2. In an optical element of claim 1 in the configuration of a liquid crystal display element comprising two substantially parallel substrates having facing surfaces, an alignment layer disposed on each facing surface wherein at least one of the alignment layers is an optical alignment layer, wherein each optical alignment layer comprises anisotropically absorbing molecules; a liquid crystal layer at least partly aligned and disposed between, and adjacent to, the alignment layers, and a spacer separating the alignment layers; the improvement wherein the anisotropically absorbing molecules consist essentially of at least one diaryl ketone and wherein the liquid display element is substantially free from irregularities in the alignment pattern when viewed at 100 time magnification between crossed polarizers.

3. An optical element of claim 1 in the configuration of an optical storage medium comprising a plurality of substrates, each coated with an optical alignment layer on at least one surface, the coated substrates being separated by a liquid crystal layer.

4. An optical element of claim 1 wherein the diaryl ketone consists essentially of at least one copolyimide of at least one diaryl ketone tetracarboxylic dianhydride and at least three diamines, consisting essentially of at least three structural elements of the formula IIa.

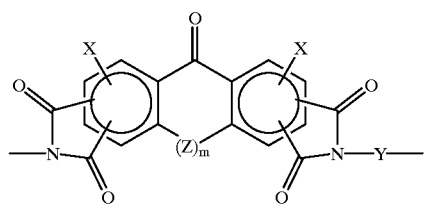
IIa wherein Y is a divalent radical selected form the formulas IIIa and IVa

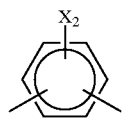
IIIa

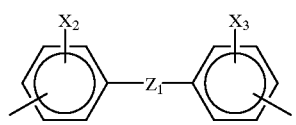
IVa wherein Z and $Z_1$ are selected, independently, from the group consisting of —S—, —$SO_2$—, —O—, —$CH_2CH_2$—, —$CH_2$—, —NR—, —$C(CF_3)_2$—, —C(O)— and a covalent bond, wherein R is a $C_1$–$C_4$ hydrocarbon chain; $X_2$ is independently selected from —$R_3$, —$OR_3$, —$SR_3$, —$N(R_4)R_3$; wherein $R_3$ is selected from $C_1$–$C_3$ perfluorinated alkyl chain and partially fluorinated alkyl chain and $R_4$ is independently selected from $R_3$ and H; $X_3$ is independently selected from $X_2$ and H; X is independently selected from the group consisting of H, Cl, F, and Br; and m is 1 or 0.

5. An optical element of claim 1 wherein the diaryl ketone consists essentially of at least one copolyimide of at least one diaryl ketone tetracarboxylic dianhydride and at least two diamines, consisting essentially of at least one structural element of the formula IIa

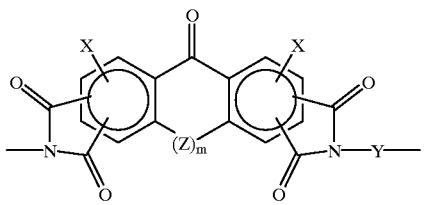
IIa wherein Y is a divalent radical selected from the formulas IIIa and IVa

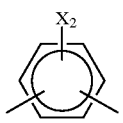
IIIa

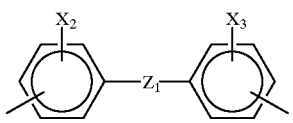
IVa and at least one structural element of formula VII

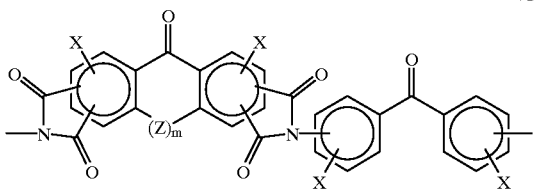
VII wherein Z and $Z_1$ are selected, independently, from the group consisting of —S—, —$SO_2$—, —O—, —$CH_2CH_2$—, —$CH_2$—, —NR—, —$C(CF_3)_2$—, —C(O)— and a covalent bond, wherein R is a $C_1$–$C_4$ hydrocarbon chain; $X_2$ is independently selected from —$R_3$, —$OR_3$, —$SR_3$, —$N(R_4)R_3$; wherein $R_3$ is selected from $C_1$–$C_3$ perfluorinated alkyl chain and partially fluorinated alkyl chain and $R_4$ is independently selected from $R_3$ and H; $X_3$ is independently selected from $X_2$ and H; X is independently selected from the group consisting of H, Cl, F, and Br; and m is 1 or 0; and the copolyimide consists of about from 99 to 1 mol % of at least one structural element of formula IIa and about from 1 to 99% of at least one structural element of formula VII.

6. An optical element of claim 1 wherein the diaryl ketone consists essentially of at least one copolyimide of at least one diaryl ketone tetracarboxylic dianhydride, at least one alicyclic tetracarboxylic dianhydride and at least one diamine, consisting essentially of at least two structural elements of the formula IIa and Va IIa

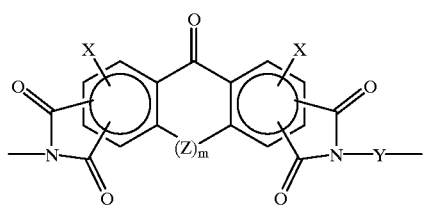

Va

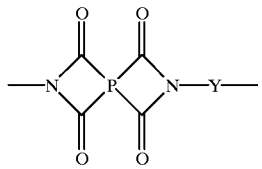

wherein Y is a divalent radical selected from the formula IIIa and IVa

IIIa

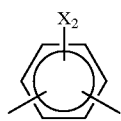

IVa

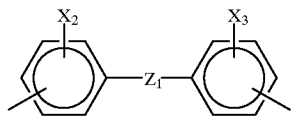

wherein Z and $Z_1$ are independently selected from the group consisting of —S—, —$SO_2$—, —O—, —$CH_2CH_2$—, —$CH_2$—, —NR—, —$C(CF_3)_2$—, —C(O)— and a covalent bond, wherein R is a $C_1$–$C_4$ hydrocarbon chain; $X_2$ is independently selected from —$R_3$, —$OR_3$, —$SR_3$, —$N(R_4)R_3$; wherein $R_3$ is selected from $C_1$–$C_3$ perfluorinated alkyl chain and partially fluorinated alkyl chain and $R_4$ is independently selected from $R_3$ and H; $X_3$ is independently selected from $X_2$ and H; X is independently selected from the group consisting of H, Cl, F, and Br; and m is 1 or 0; P is a tetravalent radical derived from said alicyclic tetracarboxylic dianhydride; and the copolyimide comprises 95 to 20 mol % of at least one structural element of formula IIa and 5 to 80 mol % of at least one structural element of formula Va.

7. An optical element of claim 1 wherein the diaryl ketone consists essentially of at least one polyimide polymer consisting essentially of at least one structural element of the formula VIII.

VIII

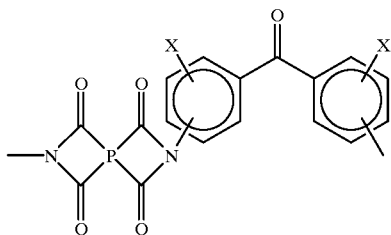

wherein P is a tetravalent optical derived from said alicyclic tetracarboxylic dianhydride; and X is independently selected from the group consisting of H, Cl, F, and Br.

* * * * *

UNITED STATES PATENT AND TRADEMARK OFFICE
CERTIFICATE OF CORRECTION

PATENT NO.    : 6,200,655 B1
DATED         : March 13, 2001
INVENTOR(S)   : Wayne M. Gibbons et al.

It is certified that error appears in the above-identified patent and that said Letters Patent is hereby corrected as shown below:

<u>Title page,</u>
Item [54], the Title of the invention, change "PROCESS FOR MATERIALS FOR ALIGNING LIQUID CRYSTALS AND LIQUID CRYSTAL OPTICAL ELEMENTS" to read -- PROCESS AND MATERIALS FOR ALIGNING LIQUID CRYSTALS AND LIQUID CRYSTAL OPTICAL ELEMENTS --.

<u>Column 34,</u>
Line 33, change "optical" to read -- radical --.

Signed and Sealed this

Third Day of September, 2002

*Attest:*

*Attesting Officer*

JAMES E. ROGAN
*Director of the United States Patent and Trademark Office*